US011099722B2

United States Patent
Byrod et al.

(10) Patent No.: US 11,099,722 B2
(45) Date of Patent: Aug. 24, 2021

(54) VIRTUAL PARALLAX TO CREATE THREE-DIMENSIONAL APPEARANCE

(71) Applicant: Apple Inc., Cupertino, CA (US)

(72) Inventors: Gunnar Martin Byrod, San Francisco, CA (US); Jan H. Bockert, Sunnyvale, CA (US); Johan V. Hedberg, Foster City, CA (US); Ross W. Anderson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/886,518

(22) Filed: May 28, 2020

(65) Prior Publication Data

US 2020/0380783 A1    Dec. 3, 2020

Related U.S. Application Data

(60) Provisional application No. 62/855,727, filed on May 31, 2019.

(51) Int. Cl.
*G06F 3/0484* (2013.01)
*G01C 21/36* (2006.01)
(Continued)

(52) U.S. Cl.
CPC ....... *G06F 3/04842* (2013.01); *G01C 21/367* (2013.01); *G01C 21/3682* (2013.01);
(Continued)

(58) Field of Classification Search
CPC ............. G06F 3/04842; G06F 3/04815; G06F 3/04845; G06T 19/003; G06T 13/20;
(Continued)

(56) References Cited

U.S. PATENT DOCUMENTS 6,182,010 B1    1/2001  Berstis
6,346,938 B1 *  2/2002  Chan ................... G06F 3/04815
                                                        345/419
(Continued)

OTHER PUBLICATIONS

Kashiwakuma, "A Virtual Camera Controlling Method Using Multi-Touch Gestures for Capturing Free-viewpoint Video", EuroITV' 13, Jun. 24-26, 2013, Como, Italy (Year: 2013).*

*Primary Examiner* — Maurice L. McDowell, Jr.
(74) *Attorney, Agent, or Firm* — Invoke

(57) ABSTRACT

In some implementations, a computing device can simulate a virtual parallax to create three dimensional effects. For example, the computing device can obtain an image captured at a particular location. The captured two-dimensional image can be applied as texture to a three-dimensional model of the capture location. To give the two-dimensional image a three-dimensional look and feel, the computing device can simulate moving the camera used to capture the two-dimensional image to different locations around the image capture location to generate different perspectives of the textured three-dimensional model as if captured by multiple different cameras. Thus, a virtual parallax can be introduced into the generated imagery for the capture location. When presented to the user on a display of the computing device, the generated imagery may have a three-dimensional look and feel even though generated from a single two-dimensional image.

21 Claims, 19 Drawing Sheets

(51) Int. Cl.
- *G06F 3/0481* (2013.01)
- *G06K 9/32* (2006.01)
- *G06T 13/20* (2011.01)
- *G06T 19/00* (2011.01)
- *G06K 9/20* (2006.01)

(52) U.S. Cl.
CPC ...... *G06F 3/04815* (2013.01); *G06F 3/04845* (2013.01); *G06K 9/3233* (2013.01); *G06T 13/20* (2013.01); *G06T 19/003* (2013.01); *G06K 2009/2045* (2013.01); *G06T 2200/24* (2013.01)

(58) Field of Classification Search
CPC ... G06T 2200/24; G06T 13/80; G06T 15/205; G01C 21/367; G01C 21/3682; G06K 9/3233; G06K 2009/2045
See application file for complete search history.

(56) References Cited

U.S. PATENT DOCUMENTS

| | | | |
|---|---|---|---|
| 8,868,338 B1* | 10/2014 | Chau | H04W 4/02 701/455 |
| 8,984,445 B1 | 3/2015 | Bailiang | |
| 9,619,138 B2 | 4/2017 | Piippo et al. | |
| 10,264,389 B1 | 4/2019 | Hwang et al. | |
| 2009/0076719 A1 | 3/2009 | Geise et al. | |
| 2010/0058212 A1 | 3/2010 | Belitz et al. | |
| 2010/0118116 A1* | 5/2010 | Tomasz | G06T 15/10 348/36 |
| 2011/0118974 A1 | 5/2011 | Chang et al. | |
| 2011/0254915 A1 | 10/2011 | Vincent et al. | |
| 2013/0006524 A1 | 1/2013 | Sasaki et al. | |
| 2013/0006525 A1 | 1/2013 | Stroila | |
| 2013/0326425 A1* | 12/2013 | Forstall | G06F 17/05 715/851 |
| 2013/0346916 A1* | 12/2013 | Williamson | G06F 3/04847 715/800 |
| 2014/0053077 A1 | 2/2014 | Unnikrishnan et al. | |
| 2014/0146046 A1* | 5/2014 | Coombe | G06T 17/00 345/423 |
| 2014/0240311 A1* | 8/2014 | Xu | G06T 13/80 345/419 |
| 2015/0074596 A1 | 3/2015 | Djabarov et al. | |
| 2015/0356770 A1* | 12/2015 | Wan | G06T 17/05 345/419 |
| 2016/0034828 A1 | 2/2016 | Sarawgi et al. | |
| 2016/0321837 A1* | 11/2016 | Dillard | G06T 15/503 |
| 2016/0350964 A1* | 12/2016 | Zhu | G06T 17/05 |
| 2017/0123618 A1 | 5/2017 | Porcella | |
| 2017/0277256 A1 | 9/2017 | Burns et al. | |
| 2017/0301051 A1 | 10/2017 | Gauglitz | |
| 2017/0358113 A1 | 12/2017 | Bray et al. | |
| 2018/0067620 A1 | 3/2018 | Adler et al. | |
| 2018/0089879 A1 | 3/2018 | O'Brien | |

* cited by examiner

VIRTUAL PARALLAX TO CREATE THREE-DIMENSIONAL APPEARANCE

RELATED APPLICATIONS

This application claims the benefit of the filing date of U.S. Provisional Patent Application No. 62/855,727 filed on May 31, 2019, which is hereby incorporated by reference.

TECHNICAL FIELD

The disclosure generally relates to generating photorealistic, three-dimensional street scenes.

BACKGROUND

Navigation applications are commonplace. Users of computing devices invoke navigation applications to present maps that show representations of streets, buildings, landmarks, and other points of interest. Users can use navigation applications to determine routes to various destinations and receive instructions for navigating selected routes. However, sometimes a user requires more context for navigation. Thus, in some navigation applications, the user can provide input to cause the computing device to present a photograph of a destination, point of interest (POI), or other location on the map. However, simple two-dimensional images may not provide enough context to be useful to the user for navigation.

SUMMARY

In some implementations, a computing device can present a dynamic street scene overlay when presenting a map view on a display of the computing device. The dynamic street scene overlay can be presented such that a user can clearly view both the dynamic street scene and the map view. The dynamic street scene can be dynamically adjusted in response to the user manipulating the map view to a different location. The dynamic street scene can be presented such that the objects in the images of the dynamic street scene have a three-dimensional look and feel. The dynamic street scene can be presented such that the dynamic street scene does not prevent the user from viewing and interacting with the map view.

In some implementations, a computing device can composite images to improve image quality when presenting three-dimensional animations on a display of the computing device. For example, while presenting images corresponding to a first location, the computing device can generate an animation based on images associated with a series of locations between the first location and user selected second location to generate a street scene animation that simulates moving from the first location to the second location. To generate the animation, the computing device can composite images captured at two different locations to generate intermediate views associated with locations between the two different locations. The images can be compo sited in such a way as to preserve good quality portions of each image while removing low quality portions of each image.

In some implementations, a computing device can simulate a virtual parallax to create three dimensional effects. For example, the computing device can obtain an image captured at a particular location. The captured two-dimensional image can be applied as texture to a three-dimensional model of the capture location. To give the two-dimensional image a three-dimensional look and feel, the computing device can simulate moving the camera used to capture the two-dimensional image to different locations around the image capture location to generate different perspectives of the textured three-dimensional model as if captured by multiple different cameras. Thus, a virtual parallax can be introduced into the generated imagery for the capture location. When presented to the user on a display of the computing device, the generated imagery may have a three-dimensional look and feel even though generated from a single two-dimensional image.

Particular implementations provide at least the following advantages. The dynamic street scene overlay allows the user to interact with and/or view a photorealistic street level view of a map location while simultaneously viewing and/or interacting with a map depicting a corresponding map area or location. By having simultaneous access to the dynamic street scene overlay and the map, the user is able to gain a better understanding of the context of a particular map location and may reduce the likelihood that the use will get lost when using the corresponding navigation application. Moreover, by selecting the best quality pixels from two different images depicting the same objects and/or perspective when compositing images, the quality of the resulting composite image can be improved thereby improving the user experience when interacting with such composite images. By introducing a parallax effect into a single two-dimensional image based on virtual locations of virtual image capture devices, the user device can create a three-dimensional effect in a two dimensional image without the expense of multiple real-world image capture devices and without using the computing resources needed to process and/or combine multiple images from multiple image capture devices (e.g., cameras).

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
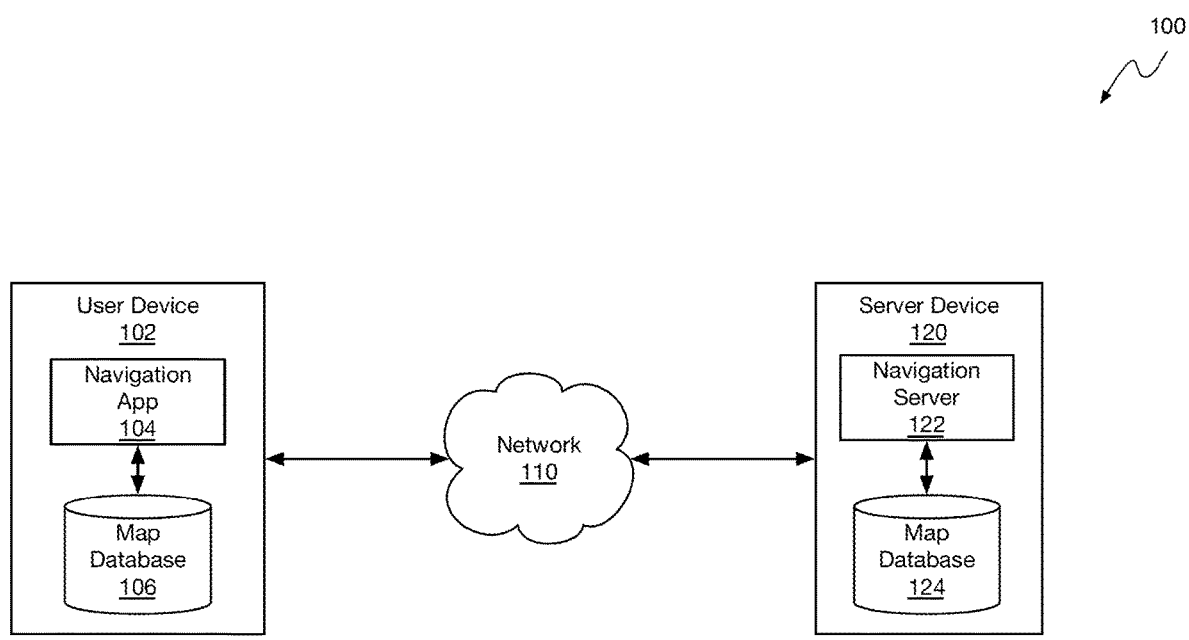
FIG. 1 is a block diagram of an example system for presenting a dynamic street scene overlay, compositing images to improve image quality, and/or introducing virtual parallax to create a three-dimensional appearance.

FIG. 1 is a block diagram of an example system 100 for presenting a dynamic street scene overlay, compositing images to improve image quality, and/or introducing virtual parallax to create a three-dimensional appearance.

System 100 can include a user device 102. For example, user device 102 can be a computing device, such as a laptop computer, tablet computer, mobile device, smartphone, smart watch, or other computing device.

User device 102 can include navigation application 104. For example, navigation application 104 can present maps, routes, location metadata, and/or imagery (e.g., captured photos) associated with various geographical locations, points of interest, etc. Navigation application 104 can obtain map data that includes data defining maps, map objects, routes, points of interest, imagery, etc., from a navigation server (e.g., navigation server 120). For example, the map data can be received as map tiles that include map data for geographical areas corresponding to the respective map tiles. The map data can include, among other things, data defining roads and/or road segments, metadata for points of interest and other locations, three-dimensional models of the buildings, infrastructure, and other objects found at the various locations, and/or images captured at the various locations. Navigation application 104 can request from the server device through network 110 (e.g., local area network, cellular data network, wireless network, the Internet, wide area network, etc.) map data (e.g., map tiles) associated with locations that user device 102 frequently visits. Navigation application 104 can store the map data in map database 106. Navigation application 104 can use the map data stored in map database 106 and/or other map data received from server device 120 to provide the navigation application features described herein (e.g., dynamic street scene overlay, compositing images to improve image quality, and/or introducing virtual parallax to create three-dimensional effects).

In some implementations, system 100 can include server device 120. For example, server device 120 can be a computing device, or multiple computing devices, configured to store, generate, and/or serve map data to various user devices, as described herein. For example, the functionality described herein with reference to server device 120 can be performed by a single computing device or can be distributed amongst multiple computing devices.

In some implementations, server device 120 can include navigation server 122. For example, navigation server 122 can be a software server configured to obtain, generate, and/or store map data. For example, navigation server 122 can obtain a lidar generated point cloud (e.g., points that define locations of surfaces of objects in the vicinity of an image capture location) for various locations included in the map data. Navigation server 122 can generate a three-dimensional model (e.g., three-dimensional mesh) for each of the various locations using the respective point clouds for the locations. Navigation server 122 can obtain images captured at the various locations (e.g., capture locations) and use the images to add texture to the three-dimensional model thereby generating a photorealistic three-dimensional image representing the corresponding location. For example, the captured images (e.g., photographs, panorama photographs, etc.) can be stretched over the surfaces of the three-dimensional model for a particular location to generate a photorealistic three-dimensional view of the particular location. The three-dimensional models and textures (e.g., captured images, stretched images, images applied to the three-dimensional model, etc.) can be stored in map database 124 on server device 120 and served to user devices (e.g., user device 102) to provide the various features and functions described herein. Navigation server 122 can be configured to obtain, generate, and/or store other map data in map database 124 as may be described herein below.

Figure 2:
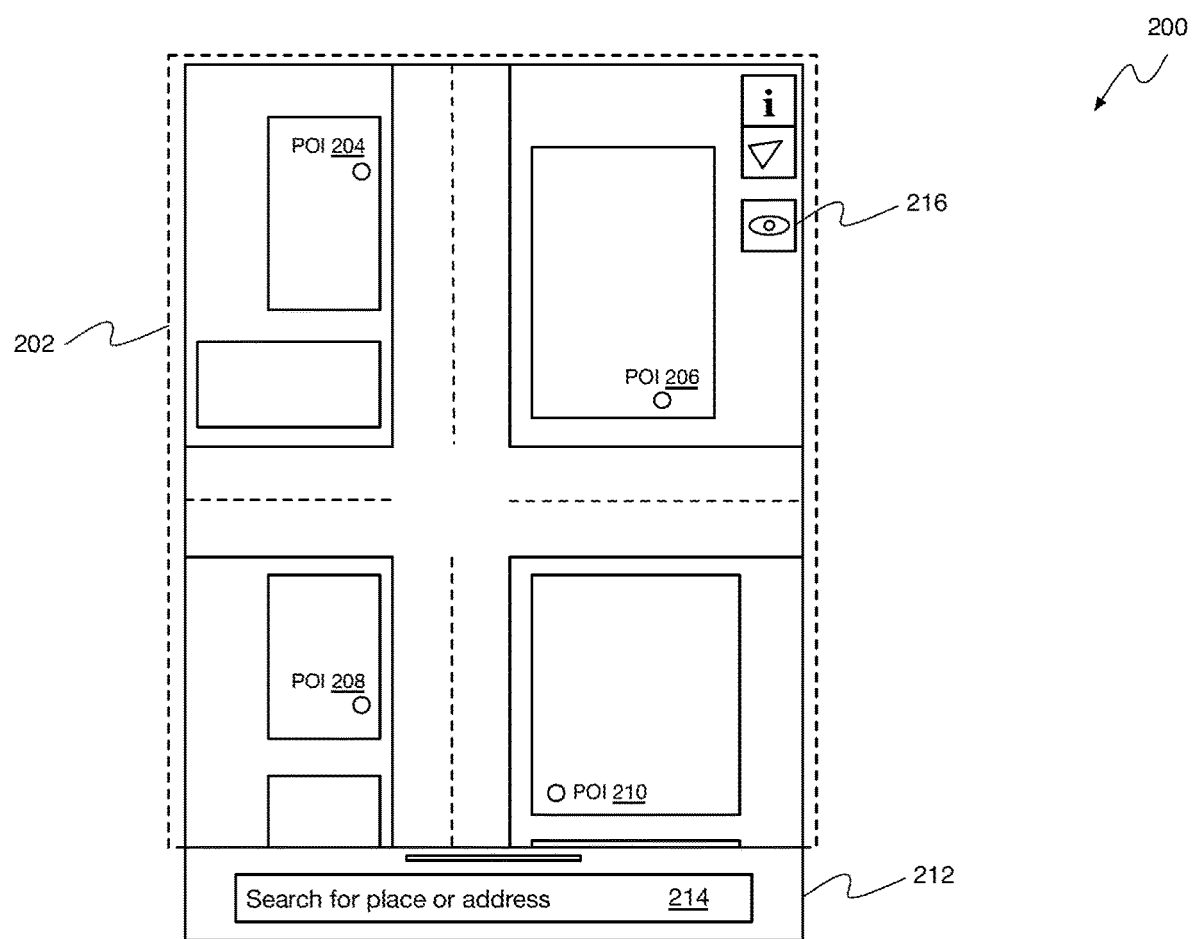
FIG. 2 illustrates an example graphical user interface for presenting a map view on a display of a user device.

FIG. 2 illustrates an example graphical user interface 200 for presenting a map view on a display of user device 102. For example, graphical user interface (GUI) 200 can be generated by navigation application 104 based on map data (e.g., map tiles) stored in map database 106.

In some implementations, GUI 200 can include map view 202. For example, map view 202 can include a map that presents graphical representation of roads, buildings, points of interest (e.g., POI 204-210), and/or other map data. While map view 202 can present three-dimensional representations of objects, such as buildings, bridges, or other landmarks, map view 202 does not include photorealistic views of the various locations, points of interest, etc., presented by map in map view 202.

In some implementations, GUI 200 can include graphical object 212 for entering search criteria for finding a place or address. For example, a user can type the name of a place (e.g., business, landmark, etc.) or an address in text entry box 214 to cause navigation application 104 to initiate a search for the user specified place or address. For example, navigation application 104 can search map database 106 for locations (e.g., places) that match the search criteria. Navigation application 104 can send a request to navigation server 122 to cause navigation server 122 to search for locations that match the search criteria. After obtaining map data corresponding to the search criteria, navigation application 104 can present a list of places that match the search criteria and the user may select one of the places to cause the place (e.g., address, point of interest, landmark, etc.) to be presented on map view 202.

In some implementations, GUI 200 can include graphical object 216 for invoking a dynamic street scene overlay. For example, in response to receiving a user selection of graphical object 216, navigation application 104 can enter a dynamic street scene mode and present the dynamic street scene overlay described with reference to FIG. 3 below.

Figure 3:
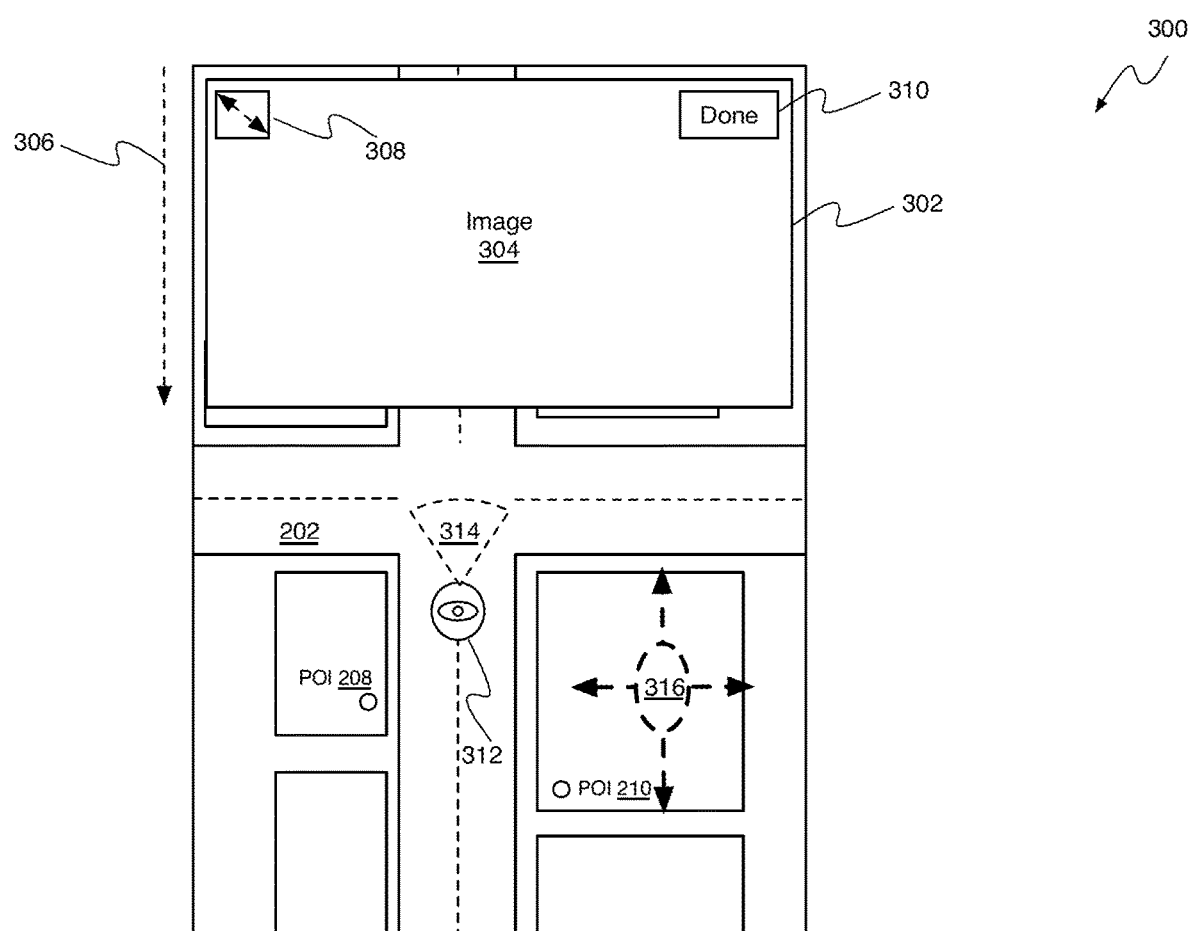
FIG. 3 illustrates an example graphical user interface presenting a dynamic street scene overlay.

FIG. 3 illustrates an example graphical user interface 300 presenting a dynamic street scene overlay. For example, GUI 300 can be presented by navigation application 104 while in a dynamic street scene mode and in response to receiving user input selecting graphical object 216, described above. GUI 300 can be presented when no point of interest is currently selected. For example, navigation application 104 can enter the dynamic street scene mode in response to receiving a user selection of graphical object 216.

In some implementations, GUI 300 can include dynamic street scene overlay 302. For example, overlay 302 can be a graphical object (e.g., window, view, card, graphical user interface element, etc.) presented over map view 202. Overlay 302 can be presented by navigation application 104 in response to receiving user input selecting graphical object 216. For example, overlay 302 can be animated to slide over map view 202. For example, overlay 302 can be animated to slide down from the top of GUI 300, as indicated by arrow 306. Overlay 302 can be sized and positioned such that when GUI 300 is viewed by the user, the user has a clear view of overlay 302 (and the image presented by overlay 302) and a portion of map view 202 that includes a currently selected location and surrounding area. For example, on some displays, overlay 302 can be sized and positioned such that overlay 302 occupies approximately the top half (e.g., 40-60%) of the display while the portion of the map view 202 that includes the currently selected location covers approximately the other half (e.g., 40-60%) of the display.

In some implementations, overlay 302 can include image 304. For example, image 304 can be a dynamic, interactive image of a map location corresponding to graphical object 312. Image 304 can be an image, or composition of multiple images (e.g., a panorama image), captured at a map location identified, or indicated, by graphical object 312 presented on the map view 202. Image 304 can represent, or correspond to, a particular perspective (e.g., scene, view, etc.) from the identified map location, as indicated by view angle cone 314 extending from graphical object 312. Navigation application 104 can obtain the map data, including location metadata, images, three-dimensional models, etc., for generating GUI 300 (and other GUIs described herein) from map database 106 stored on user device 102 and/or from server device 120.

In some implementations, overlay 302 can present a dynamic street scene. For example, when user input to overlay 302 is received by navigation application 104, navigation application 104 can dynamically change image 304 to present a different perspective (e.g., different view, scene, etc.) of the location corresponding to graphical object 312. For example, when user input (e.g., a swipe touch input gesture) is received through overlay 302, navigation application 104 can cause image 304 to pan left, right, up, or down to present a different perspective of the current location of graphical object 312 corresponding to the input received. In coordination with the change in perspective, view angle cone 314 can rotate around graphical object 312 to indicate the change in perspective, or direction of view, represented by image 304.

In some implementations, overlay 302 can present image 304 with using a virtual parallax to create a three-dimensional effect. For example, navigation application 104 can use the virtual parallax techniques disclosed herein to present image 304 with a three-dimensional look and feel, as described herein below.

In some implementations, user input received through overlay 302 can cause navigation application 104 to present a new location on map view 202 and/or overlay 302. For example, the user can provide input (e.g., a tap) selecting a distant location represented in image 304 to cause navigation application 104 to move graphical object 312 from its current location to a new location corresponding to the user input. A different image 304 can be presented in overlay 302 that represents the new location. Thus, map view 202 and the location corresponding to graphical object 312 as well as image 304 can change based on the user input received through overlay 302.

In some implementations, GUI 300 can include graphical object 312 representing the current dynamic street scene location. For example, graphical object 312 can have an appearance (e.g., an icon, image, etc.) that represents, or indicates, that navigation application 104 is currently in the dynamic street scene mode. When GUI 300 is presented, graphical object 312 can be initially located at a streel level image capture point (e.g., a map location corresponding to a real-world location where streel level images are captured) near the center of map view 202. The map within map view 202 can be shifted such that the map area surrounding the initial location is presented with the initial location centered in the area in the lower portion of GUI 300 that is not covered by overlay 302.

In some implementations, while graphical object 312 may be positioned at different locations with respect to map view 202, graphical object 312 may remain at a static location within the map view 202 and/or GUI 300. For example, graphical object 312 will remain stationary while the map presented by map view 202 is moved beneath graphical object 312 to place graphical object 312 at a new map location. Graphical object 312 can, for example, remain at a centered location (e.g., horizontally and/or vertically) within map view 202 while the map is moved beneath graphical object 312.

In some implementations, navigation application 104 can receive user input with respect to map view 202 to change the current location presented on GUI 300. For example, a user can provide input 316 (e.g. touch input) to map view 202 to move, scroll, or change the portion of the map presented by map view 202. For example, navigation application 104 can detect a user input 316 (e.g., a touch and drag input) indicating that the user wishes to move the map left, right, up, or down. As the map is moved, the position of graphical object 312 can change with respect to the underlying map. When graphical object 312 is located over a desired location on the map, the user can cease the user input. When navigation application 104 detects the cessation of user input, navigation application can update overlay 302 with a different image 304 representing the current map location corresponding to graphical object 312 and/or view angle cone 314.

In some implementations, view angle cone 314 can point upward towards the top of GUI 300 by default. In some implementations, view angle cone 314 can point in the direction of map movement that resulted in the current location being selected for presentation on overlay 302. For example, if the user input caused graphical object 312 to move in an eastward direction on the map to arrive at its current map location, then view angle cone 314 can point in an eastward direction and overlay 302 can present a corresponding image 304 of the eastward view from the current location.

In some implementations, overlay 302 can include graphical object 310 for dismissing overlay 302. For example, in response to receiving a user selection of graphical object 310, navigation application 104 can hide overlay 302 and present GUI 200.

Figure 10:
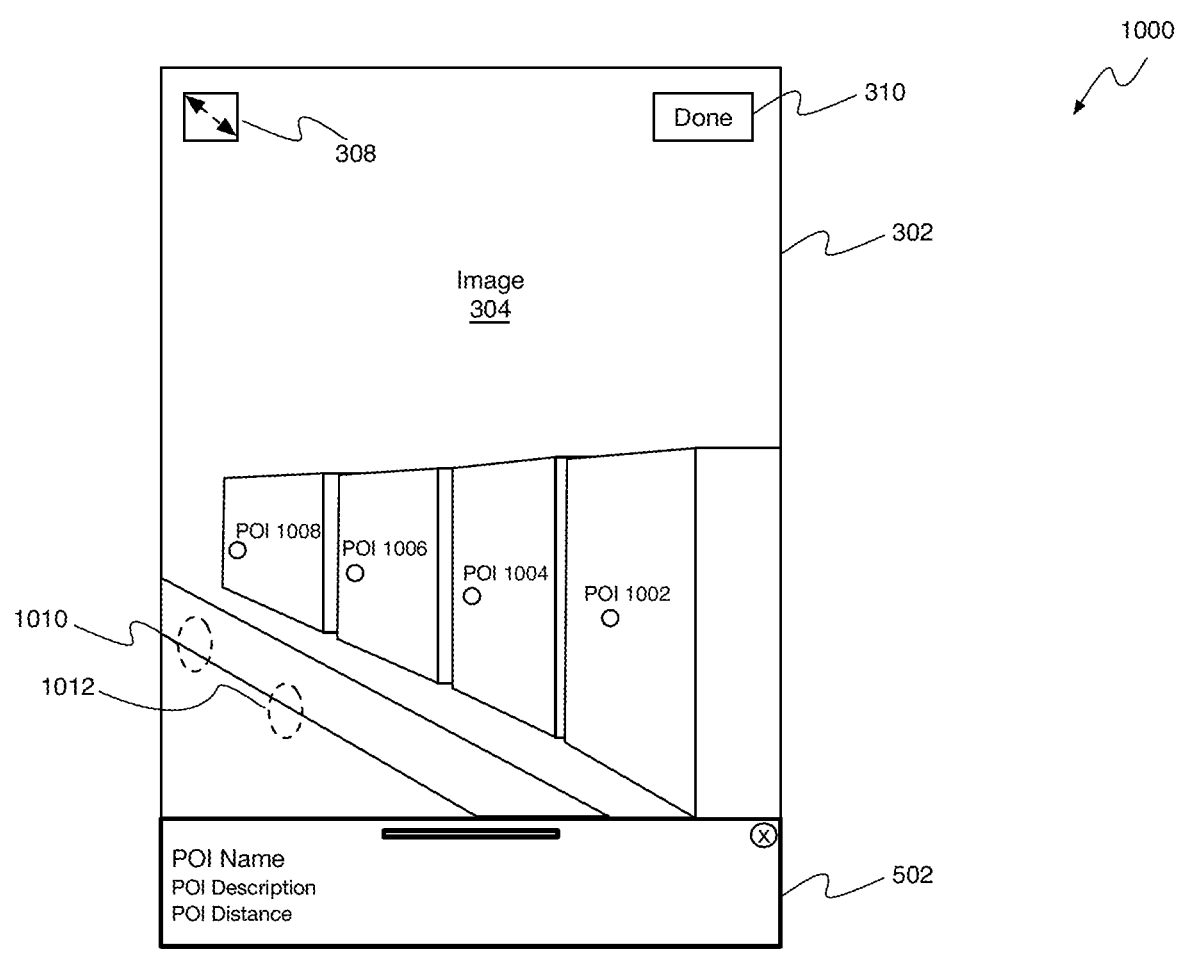
FIG. 10 illustrates an example graphical user interface for selecting a point of interest from within a dynamic street scene overlay.

In some implementations, overlay 302 can include graphical object 308 for transitioning between partial screen and full screen versions of overlay 302. For example, when in partial screen view, as illustrated by FIG. 3, receiving user input selecting graphical object 308 can cause navigation application 104 to present a full screen version of overlay 302, as illustrated by FIG. 10 below. When in full screen view, as illustrated by FIG. 10, receiving user input selecting graphical object 308 can cause navigation application 104 to present a partial screen version of overlay 302, as illustrated by FIG. 3.

Figure 4:
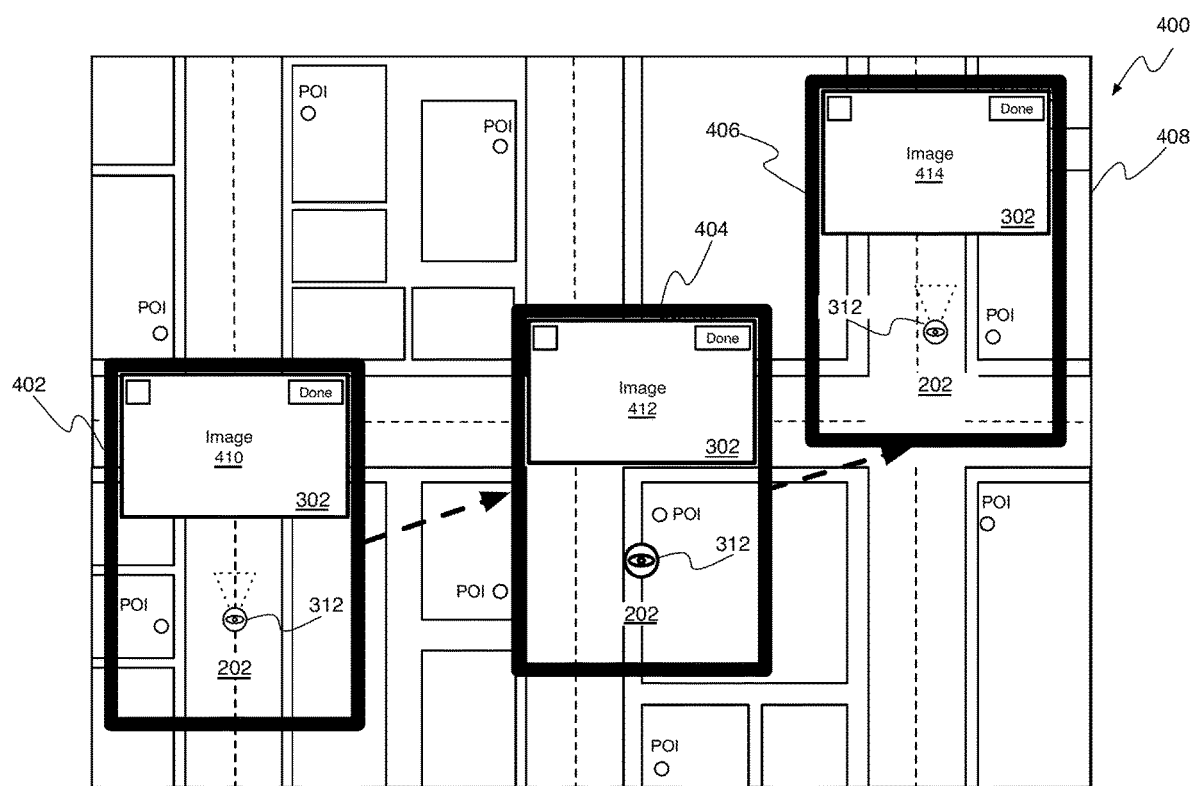
FIG. 4 is an illustration representing changes to a GUI while navigating a map view.

FIG. 4 is an illustration 400 representing changes to GUI 300 while navigating map view 202. For example, illustration 400 includes device representations 402, 404, 406 that all correspond to a single user device 102. Each of the device representations 402, 404, and 406 present GUI 300, as described above, and present a different portion of map 408 in each map view 202.

Device representation 402 can represent a starting point or location presented by GUI 300. For example, graphical object 312 in device representation 402 can correspond to a starting location on map 408. As described above, image 410 (e.g., image 304) can present a photorealistic representation (e.g., photograph, photorealistic three-dimensional model, etc.), of the starting location. As a user provides input to map view 202 or overlay 302 to move map 408, the portion of map 408 presented in map view 202 can change (e.g., the map can scroll within map view 202 according to the user input), however graphical object 312 will remain at its relative location within the graphical user interface and/or device display as the map is adjusted.

In some implementations, the representation of graphical object 312 may be adjusted to indicate that a map manipulation is in progress. For example, graphical object 312 may be enlarged, shadowed, etc., to cause graphical object 312 to appear to be lifted or raised off of map 408 in map view 202 to indicate that a location for graphical object 312 has not been selected yet. Additionally, as depicted by device representation 404, view angle cone 314 may be removed. For example, as graphical object 312 is animated to lift up off of map 408 when movement of map 408 is initiated, view angle cone 314 can be animated to shrink back into graphical object 312.

While the map is being manipulated, graphical object 312 may be associated with map locations where image capture points (e.g., locations where street scene images were captured) are not available. For example, as demonstrated by device representation 404, graphical object 312 can be presented over a building or other off-street location where street level images are not available. To indicate that street level images and/or map data for the current location of graphical object 312 are not available, the appearance of graphical object 312 can be dimmed or otherwise altered. Similarly, to indicate that street level images and/or map data for the current location of graphical object 312 are not available, overlay 302 can be dimmed. In some implementations, when overlay 302 is dimmed, no street level image 412 may be presented in overlay 302. In some implementations, when overlay 302 is dimmed, the street level image 410 for the previous location may be presented in overlay 302 or some default image 412 can be presented.

Once the adjustment of map 408 in map view 202 is completed, graphical object 312 can return to its smaller size thereby making it appear that graphical object 312 has been placed back down onto map 402 in map view 202, as illustrated by device representation 406. Moreover, when navigation application 104 detects that the user input manipulating map 408 has stopped, navigation application 104 can determine the map location corresponding to graphical object 312, as illustrated by device representation 406, and present image 414 corresponding to the determined map location in an undimmed overlay 302.

If graphical object 312 is located over a map location where no street level images exist (e.g., graphical object 312 is not over an image capture point), then navigation application 104 can move map 408 so that graphical object 312 is placed over the nearest image capture point. If an image capture point is not within a threshold distance of graphical object 312, then graphical object 312 may remain in a raised, dimmed state (e.g., opacity dimmed to 40%, 35%, etc.) until the user provides additional input to move map 408 so that graphical object 312 is located at or near a street level image capture point (e.g., a location having map data that includes a captured street level image).

Figure 5:
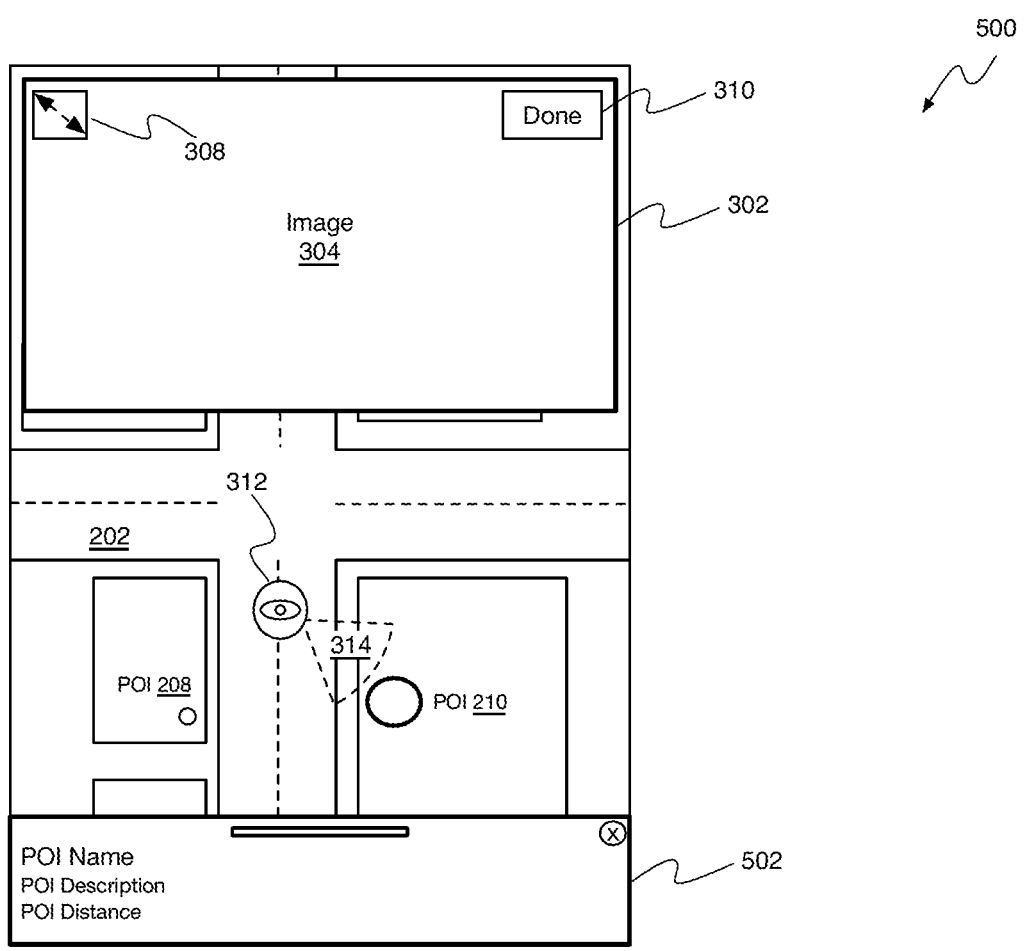
FIG. 5 illustrates an example graphical user interface for presenting a dynamic street scene overlay related to a selected point of interest.

FIG. 5 illustrates an example graphical user interface 500 for presenting a dynamic street scene overlay related to a selected point of interest. For example, GUI 500 can be presented by navigation application 104 on a display of user device 102. GUI 500 can be presented when navigation application 104 receives user input selecting a point of interest (e.g., POI 210) presented by GUI 300 while in dynamic street scene mode.

In some implementations, GUI 500 can be presented when navigation application 104 receives user input selecting invoking dynamic street scene mode (e.g., as described with respect to FIG. 2) while a point of interest (e.g., POI 210) is selected (e.g., has already been selected). For example, navigation application 104 can receive user input selecting POI 210 while GUI 200 is presented followed by receiving user input selecting graphical object 215 to invoke dynamic street scene mode. Alternatively, navigation application 104 can receive user input to graphical object 212 (e.g., a search control) specifying search parameters for a desired point of interest. The navigation application 104 can receive a user selection of a point of interest from the search results followed by a user selection of graphical object 216 to enter dynamic street scene mode with respect to the point of interest (e.g. POI 210).

In some implementations, navigation application 104 can modify the appearance (e.g., highlight, make larger, change color, etc.) of the selected POI 210, and graphical object related thereto, on GUI 300 so that the user can quickly, visually distinguish the selected POI 210 from other points of interest (e.g., POI 208) presented on GUI 500.

In some implementations, GUI 500 can present graphical object 312 indicating a street level image capture point related to the selected point of interest. For example, GUI 500 can present graphical object 312 at a map location corresponding to a real-world location where images for the selected POI 210 were captured. GUI 500 can present view angle cone 314 directed at the selected POI 210 in association with graphical object 312 to indicate the relative positions of the image capture point and the selected POI 210 and the angle at which the POI image was captured. Overlay 302 can initially present an image 304 (e.g., photograph, photorealistic image, etc.) representing POI 210 from the map location of graphical object 312 at the angle represented by view angle cone 314. The user can interact with image 304 as described above with reference to FIG. 3. For example, the user can manipulate (e.g., pan) the image 304 or interact with image 304 to cause map view 202 to present a different location (e.g., different POI).

In some implementations, GUI 500 can present placecard 502. For example, placecard 502 can be presented in a minimized size and can present information related to the selected POI 210. The POI information can include a POI name (e.g., name of restaurant, building, park, bridge, landmark, etc.), a POI description (e.g., a POI type, such as restaurant, landmark, park, etc.), a POI distance (e.g., from the current location of user device 102 to the selected POI), and/or other POI information. As illustrated in FIG. 5, placecard 502 is in a minimized state in the lower portion of GUI 500.

Figure 6:
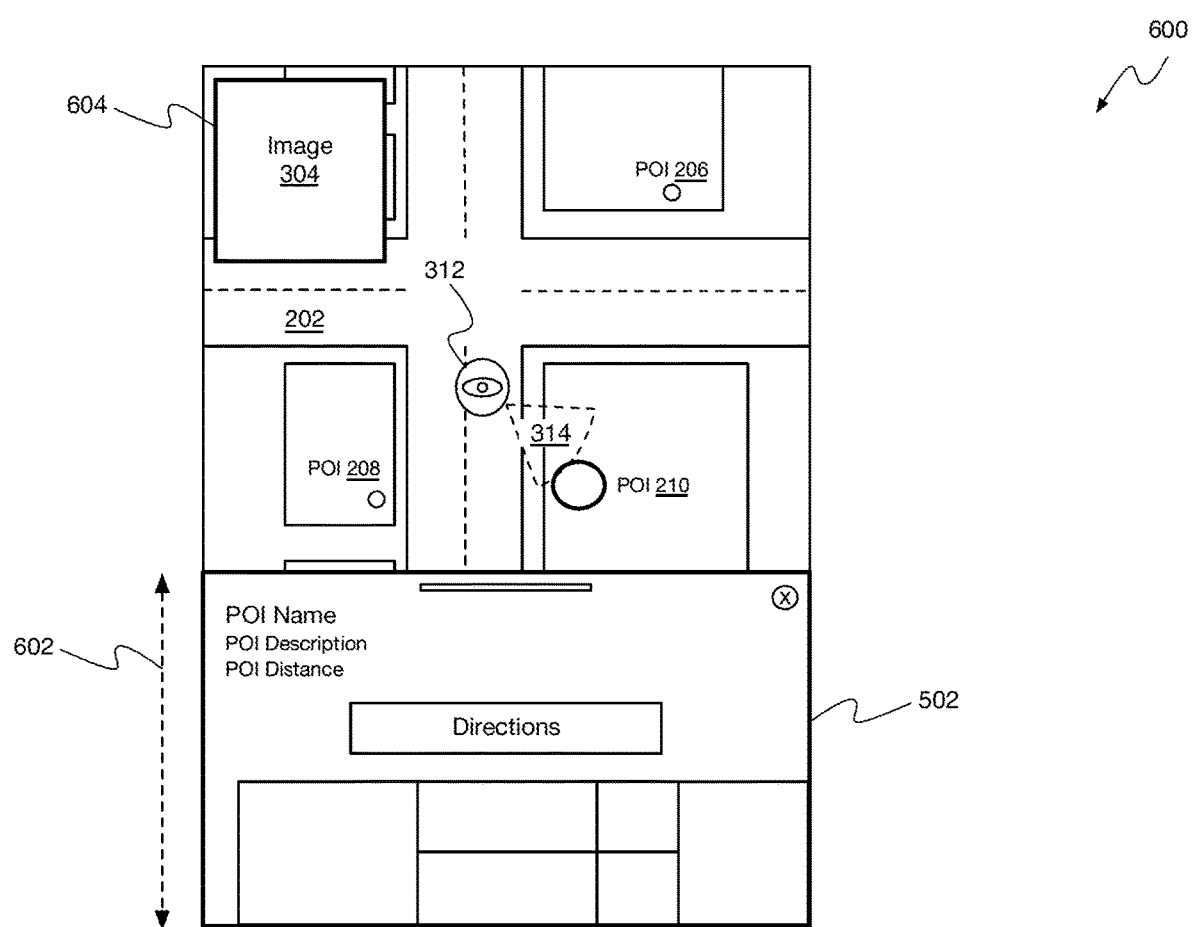
FIG. 6 illustrates an example graphical user interface for presenting a minimized dynamic street scene overlay.

FIG. 6 illustrates an example graphical user interface 500 for presenting a minimized dynamic street scene overlay. For example, GUI 500 can be presented by navigation application 104 in response to receiving user input expanding placecard 502 to a medium size and a mid-display position on GUI 500. For example, a user can provide input dragging the top edge of minimized placecard 502 presented on GUI 500 up (e.g., as indicate by dashed arrow 602) to a mid-display position to expand placecard 502 and cause placecard 502 to present additional information (e.g., pictures, images, selectable graphical objects, etc.) related to the selected POI 210.

In some implementations, navigation application 104 can minimize overlay 302 to make room for the expansion of placecard 502. For example, in response to receiving the user input expanding placecard 502, navigation application 104 can reduce the size of overlay 302 and locate overlay 302 in an upper corner (e.g., upper right corner, upper left corner, etc.) of GUI 600, as illustrated by minimized overlay 604. Overlay 604 can present the same image 304 for the selected POI 210, as described above, albeit in a smaller form. Navigation application 104 can present an animation that causes the larger overlay 302 to appear to shrink down to the size of the smaller overlay 604. The animation can be synchronized with, or can coincide with, the expansion of placecard 502.

In some implementations, navigation application 104 can shift the map in map view 202 so that the selected POI 210 is not covered by the expanded placecard 502. For example, in synchronization with the expansion of placecard 502 and minimizing of overlay 302, navigation application 104 can shift the map toward the top of GUI 600 such that the selected POI 210, graphical object 312, and/or view angle cone 314 are not covered or obscured by expanding placecard 502 up into GUI 600.

In some implementations, navigation application 104 can enlarge overlay 604 when placecard 502 is minimized. For example, navigation application 104 can receive user input dragging placecard 502 back down toward the bottom of GUI 600. As the placecard 502 is animated downward toward the bottom of GUI 600, overlay 604 can be animated to grow larger and become overlay 302. Map view 202 can be altered simultaneously with the minimization of placecard 502 and the expansion of overlay 604 to shift the map so that the selected POI 210, graphical object 312, and view angle cone 314 are not obscured or covered by the larger overlay 302, as illustrated by FIG. 5.

Figure 7:
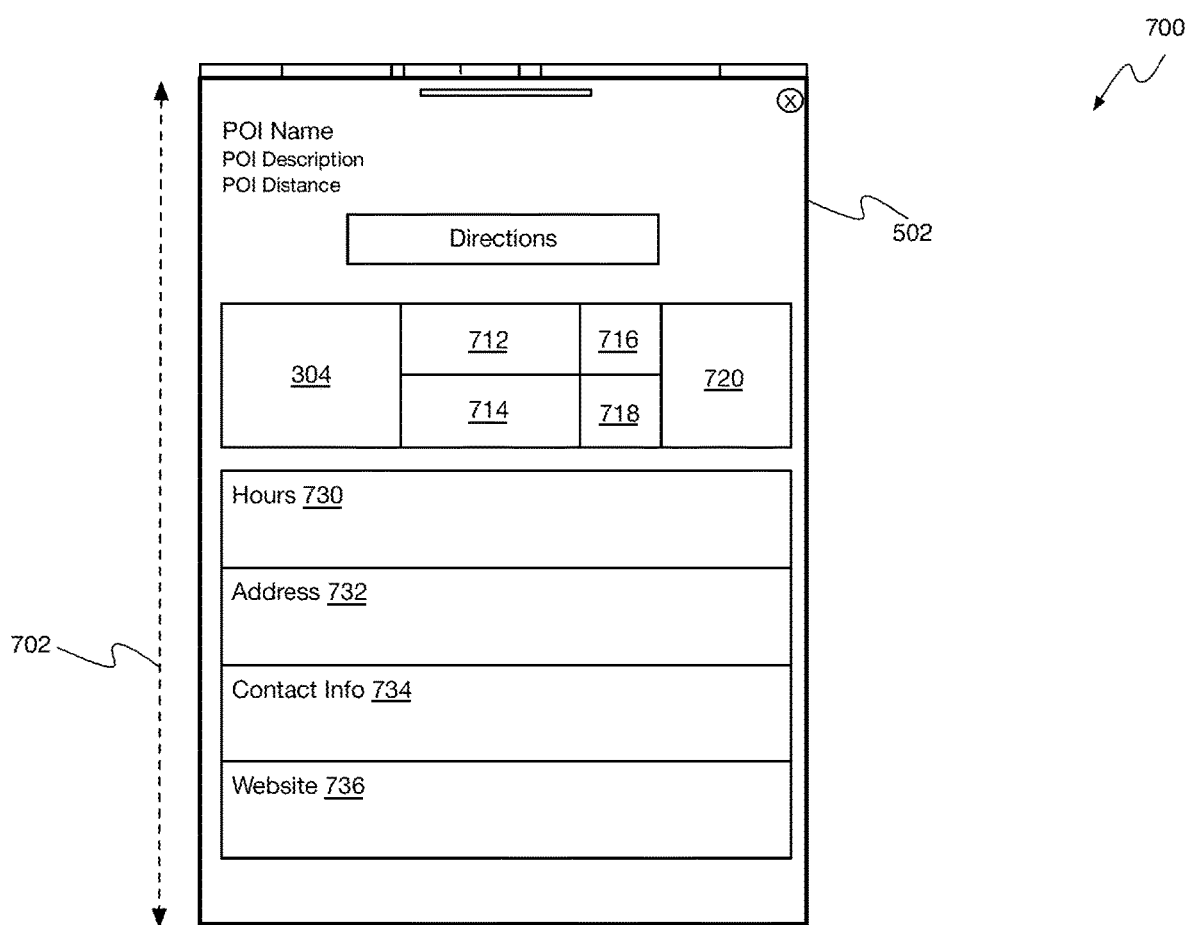
FIG. 7 illustrates an example graphical user interface presenting a maximized view of a placecard.

FIG. 7 illustrates an example graphical user interface 700 presenting a maximized view of a placecard. For example, GUI 700 can be presented by navigation application 104 on a display of user device 102. GUI 700 can be presented in response to receiving user input dragging placecard 502 to the top of the display of user device 102, as indicated by arrow 702. As illustrated by FIG. 7, the maximized (e.g., full-screen, in some instances) view of placecard 502 completely or mostly covers map view 202 and/or dynamic street scene overlay 302/604.

As illustrated in FIG. 7, when maximized, placecard 502 can present additional information such as images (e.g., pictures) 712-720, business hours 730, address 732, contact information 734 (e.g., email address, telephone number, etc.), and/or website address 736, among other things. However, when overlay 302/604 is obscured or hidden, placecard 502 can present image 304 corresponding to the selected POI 210 that would have been presented on overlay 302/604. As described above, image 304 can be a dynamic image in that the user may manipulate the image (e.g., provide input to pan the image) and the presentation of image 304 may include the virtual parallax effect described herein below to cause image 304 to appear to be a three-dimensional image.

When the user is finished viewing the maximized view of placecard 502, the user can drag the placecard 502 back down to the mid-display position to cause navigation application 104 to present GUI 600 or drag placecard 502 all the way down to the bottom of GUI 700 to cause navigation application 104 to present GUI 500, as described above. For example, when transitioning from GUI 700 to GUI 500, navigation application 104 can present GUI 600 then GUI 500 and the animations described above for transitioning from GUI 600 to GUI 500.

Figure 8:
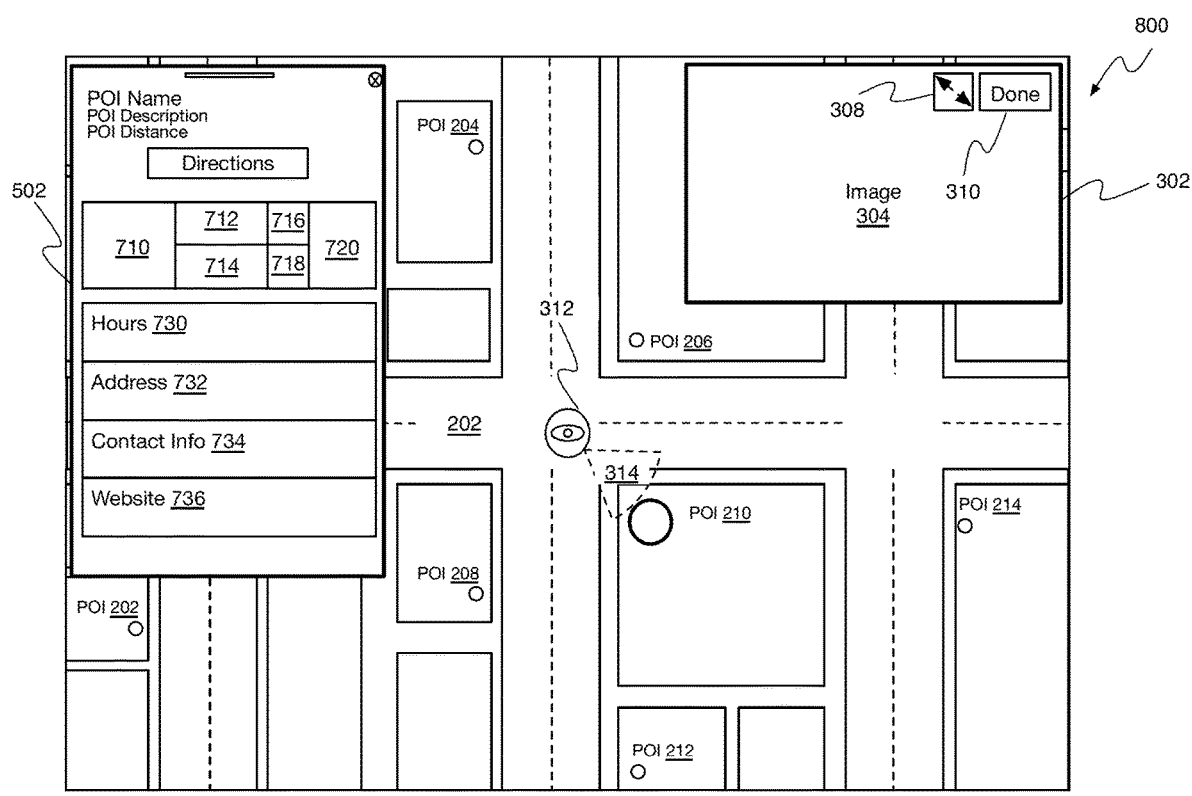
FIG. 8 illustrates an example graphical user interface for presenting a maximized view of a placecard simultaneously with a dynamic street scene overlay.

FIG. 8 illustrates an example graphical user interface 800 for presenting a maximized view of a placecard simultaneously with a dynamic street scene overlay. For example, GUI 800 can be presented by navigation application 104 on a user device 102 that has a large display area (e.g. such as a tablet computer, laptop computer, etc.). Because the large display allows more area for presenting content, navigation application 104 may present a maximized view of placecard 502 and dynamic street scene overlay 302 while still presenting enough of the map in map view 202 that the user can view the map area surrounding the currently selected point of interest and/or image capture point.

In some implementations, GUI 800 can include a maximized view of placecard 502. For example, the maximized view of placecard 502 can allow navigation application 104 to present more information about the selected point of interest (e.g., POI 210) than the medium sized or minimized views of placecard 502. As described above, this POI information can include POI name, POI description, POI distance, images 710-720 related to the selected POI, operating hours information 730, address information 732, contact information 734, and/or website information 736, among other things. The maximized view of placecard 502 in GUI 800 can be presented opposite overlay 302 (e.g., in the upper left or upper right corner of GUI 800).

In some implementations, GUI 800 can include dynamic street scene overlay 302. For example, when presented in GUI 800, overlay 302 can include all of the configurations and behaviors described above and/or below with reference to overlay 302. Overlay 302 can include the dynamic, interactive image 304, for example. GUI 800 can include graphical object 312 indicating a capture point location corresponding to a map location where image 304 was captured. GUI 800 can include view angle cone 314 indicating the perspective of image 304 from the map location of graphical object 312. GUI 800 can include an emphasized (e.g., highlighted) representation of the selected POI 210, as described above.

Figure 9:
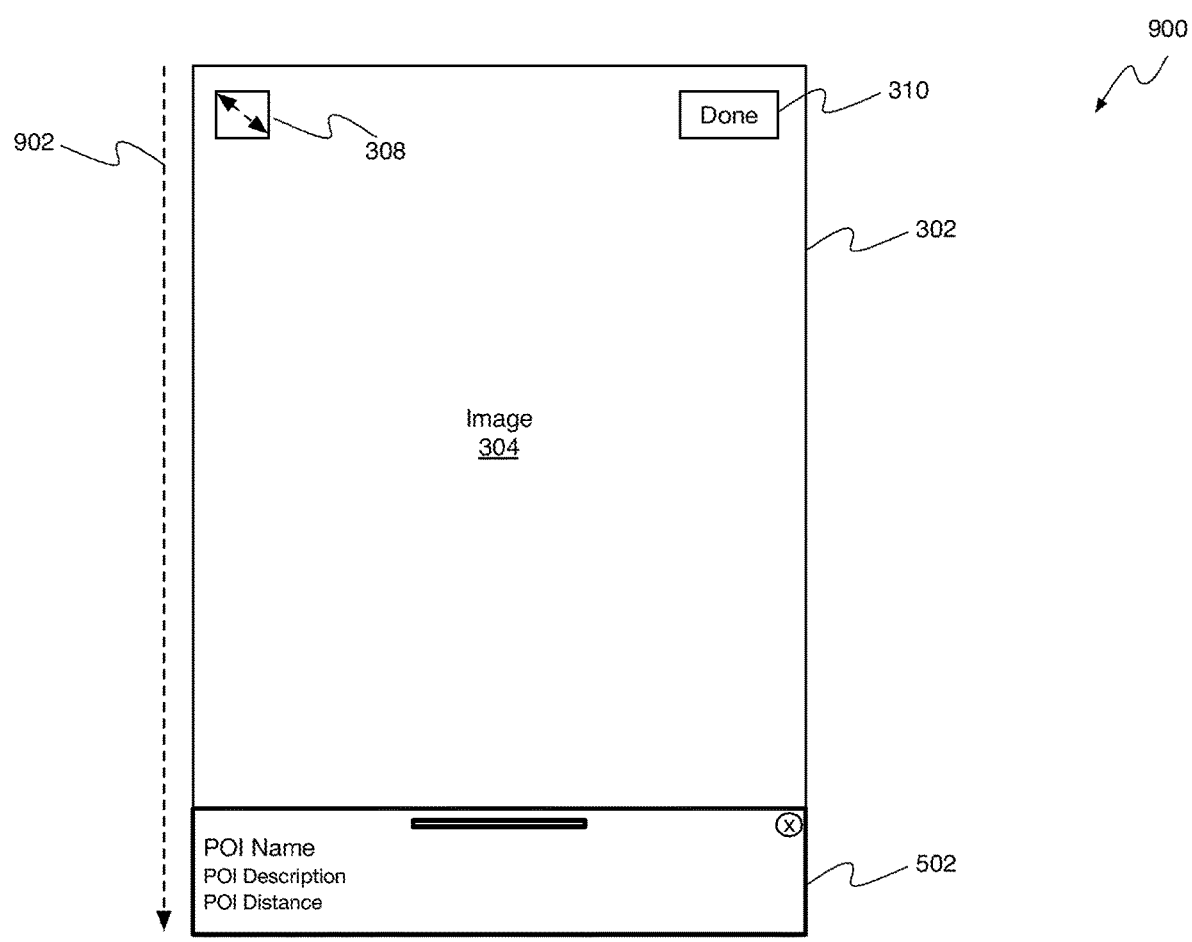
FIG. 9 illustrates an example graphical user interface for presenting a maximized view of a dynamic street scene overlay.

FIG. 9 illustrates an example graphical user interface 900 for presenting a maximized view of dynamic street scene overlay 302. For example, GUI 900 can be presented by navigation application 104 on a display of user device 102 in response to receiving a user selection of graphical object 308 presented on GUI 300, GUI 500, or GUI 800, as described above. When maximized, overlay 302 can cover most or all of the display of user device 102. For example, when no point of interest is currently selected, overlay 302 can cover the entire display area of user device 102. When a point of interest is currently selected, overlay 302 can cover the entire display area of user device 102, however, GUI 900 may also present placecard 502 over a portion of overlay 302 to present information relevant to the selected point of interest, as described above.

In some implementations, overlay 302 can be animated to expand to its maximized size. For example, in response to receiving the user selection of graphical object 308 when overlay 302 is presented in its default size (e.g., covering approximately 30-60% of the display of user device 102), navigation application 104 can present an animation that causes overlay 302 to appear to grow or expand down from its position at the top of GUI 300 or GUI 500 to cover the entire display of user device 102, as indicated by arrow 902. When graphical object 308 is selected from the larger display GUI 800, navigation application 104 can present an animation that causes overlay 302 to appear to grow or expand down and horizontally from its position at the top corner of GUI 800 to cover the entire display of user device 102.

FIG. 10 illustrates an example graphical user interface 1000 for selecting a point of interest from within a dynamic street scene overlay. For example, GUI 1000 can be presented by navigation application 104 on a display of user device 102. GUI 1000 can present, for example, a maximized view of dynamic street scene overlay 302.

In some implementations, dynamic street scene overlay 302 can include image 304 depicting points of interest near the currently selected map location (e.g., point of interest or image capture point). For example, image 304 can include images of buildings, points of interest, roads, sidewalks, and other objects captured by an image capture device when located at a real-world location corresponding to the selected map location. When presented in a maximized overlay 302, navigation application 104 can present labels identifying various points of interest (e.g., POI 1002-1008) included in image 304.

In response to receiving user input selecting one of the POI labels (e.g., POI 1006), navigation application 104 can present the user selected POI 1006 as the currently selected POI in the various graphical user interfaces described above. For example, navigation application 104 can present an animation in overlay 302 that causes image 304 to simulate moving from the current point of interest (e.g., POI 1002, or image capture point associated therewith) to the user selected point of interest (e.g., POI 1006, or image capture point associated therewith). The animation can be generated using the image compositing technology disclosed herein below.

In some implementations, navigation application 104 can receive user input selecting an image capture point through overlay 302. For example, instead of receiving a user selection one of the presented POIs 1002-1008, navigation application 104 may receive a user selection (e.g., user input 1010, user input 1012, touch input, etc.) of a location on a street, sidewalks, area other than that associated with a POI label or POI. In response to receiving the user input, navigation application 104 can determine the image capture point nearest to the map location associated with the user input and change the currently selected map location to the map location associated with the determined image capture point. Navigation application 104 can present an animation in overlay 302 that causes image 304 to simulate moving from the current point of interest (e.g., POI 1002, or image capture point associated therewith) to the determined image capture point nearest to the user input (e.g., input 1010, 1012, etc.). The animation can be generated using the image compositing technology disclosed herein below.

Figure 11:
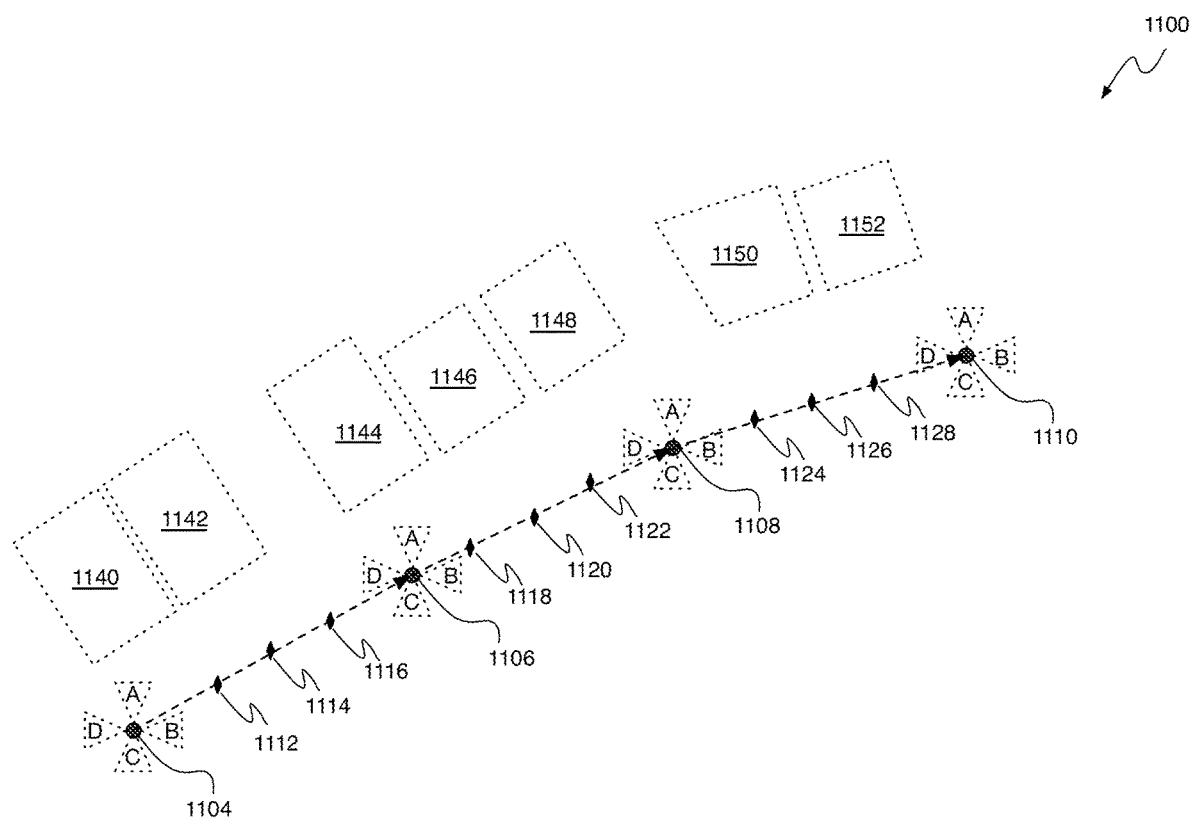
FIG. 11 is an illustration of an example process for compositing images to improve image quality.

FIG. 11 is an illustration 1100 of an example process for compositing images to improve image quality. For example, user device 102 can generate a photorealistic animation when moving a virtual device from a current image capture point to a newly selected image capture point (e.g., destination location). To do so, user device 102 can generate intermediate views of the environment along the path at intermediate locations along a path from the current image capture point to the destination image capture point. For example, an intermediate view and/or capture point view can correspond to an image that presents a perspective of a photorealistic three-dimensional model (e.g., model textured with captured images) from a corresponding intermediate location or capture point location. User device 102 can generate the photorealistic animation by presenting a sequence of frames that include a series of intermediate views and image capture point views along the path. When generating images or views representing intermediate locations between two image capture points, navigation application 104 can combine the least distorted, highest quality portions of the images (e.g., image capture point views) captured at the two image capture points to generate a high-quality composite image for each intermediate view (e.g., animation frame).

Illustration 1100 includes image capture points 1104-1110. For example, image capture points 1104-1110 can correspond to real-world locations where a map data collection system (e.g., an automobile with cameras and sensors) captures images and geometry data describing buildings and/or other objects near each image capture point. For example, at each image capture point 1104-1110, the map data collection system can capture images corresponding to different perspectives (e.g., perspectives or angles A, B, C, D, etc.). The map data collection system can also use sensors (e.g., lidar sensors) at each image capture point 1104-1110, and/or locations in between, to generate measurements (e.g., a point cloud indicating the locations of surfaces of nearby objects relative to the image capture point) representing or corresponding to the geometry of nearby objects 1140-1152 (e.g., buildings, trees, cars, light posts, etc.). The map data collection system can also use location sensors (e.g., global satellite positioning systems, Wi-Fi based location systems, cellular based location systems, etc.) to determine the location of each image capture point 1104-1110. The map data collection system can then send the data collected for each image capture point 1104-1110 to server device 120 for processing.

In some implementations, server device 120 can process the map data collected for each image capture point 1104-1110 to generate three-dimensional models of the areas near each image capture point. For example, server device 120 can generate a triangular mesh for each image capture point 1104-1110 based on the point cloud generated at the respective image capture points. The triangular mesh can be generated to create a three-dimensional model of each image capture point 1104-1110, and points in between, and the objects (e.g., surfaces of objects 1140-1152) near each image capture point 1104-1110. For example, server device 120 can combine the point clouds generated at each image capture point 1104-1110 and generate a triangular mesh to create a three-dimensional model for the map area covered by image capture points 1104-1110 and points in between.

In some implementations, server device 120 can process the map data collected for each image capture point 1104-1110 to generate textures for the three-dimensional models generated for each image capture point. For example, server device 120 can combine the images captured for each perspective A, B, C, D at each image capture point 1104-1110 to generate a panoramic image (e.g., 360-degree image) of each image capture point. This panoramic image, or portions thereof, corresponding to an image capture point can be applied to the three-dimensional model generated for the image capture point to add texture (e.g., imagery representing objects, colors, textures, etc.) to the three-dimensional model. Server device 120 can determine which portions of the captured images correspond to which surfaces of the three-dimensional model and store a mapping of image portions to model surfaces. Since the captured images correspond to a particular perspective of the modeled surfaces from the particular image capture point where the images were captured, the captured images can be used to provide a textured view (e.g., photorealistic view) of the model from the perspective of the corresponding image capture point when the captured images are applied to (e.g., draped over, painted on, etc.) the corresponding surfaces of the three-dimensional model. This textured view (e.g., image) or photorealistic view (e.g., image) of the three-dimensional model from the perspective of a particular image capture point can be referred to herein as an image capture point view (e.g., image).

When sending map data for various locations to a user device (e.g., user device 102), server device 120 can send map tiles corresponding to the various locations that include for each image capture point within the map tiles a location (e.g., latitude and longitude), the corresponding texture image, and the corresponding three-dimensional model, among other data that may be described herein. In some implementations, the map tiles can include data (e.g., links, references, addresses, etc.) indicating where user device 102 can obtain the image capture point data the corresponding texture image, and the corresponding three-dimensional model, or portion thereof.

In some implementations, user device 102 can generate a photorealistic animation that simulates moving from one image capture point location to another image capture point location. For example, user device 102 can present images related to a currently selected image capture point (e.g., first image capture point) in a dynamic street scene overlay, as described above. User device 102 can receive user input selecting another image capture point, or point of interest, (e.g., second image capture point). Instead of simply presenting images corresponding to the first image capture point followed by images corresponding the second image capture point, user device 102 (e.g., navigation application 104) can generate intermediate views at intermediate locations between the first image capture point and the second image capture point. For example, an intermediate view can be an image of the three-dimensional model textured with (e.g., painted with, colored with, etc.) corresponding captured images from the perspective of a virtual device (e.g., virtual camera) at an intermediate location. The intermediate views can be generated based on the capture point views (e.g., the captured images applied to the three-dimensional models) corresponding to the first and/or second image capture points and transformed according to a virtual perspective of a virtual device at each intermediate location. User device 102 can present the intermediate views in sequence to present a photorealistic animation that has the appearance of moving from the location of the first image capture point to the location of the second image capture point in the real-world.

In some implementations, user device 102 can generate the intermediate views according to a frame rate of user device 102. For example, if user device 102 has a frame rate of 120 frames per second (e.g., user device 102 can generate and/or present 120 video frames per second), user device 120 can generate 120 intermediate views per second. Thus, if the transition between image capture point 1006 and 1008 is configured to take one second, user device 102 can generate 120 intermediate views corresponding to 120 different virtual device locations (e.g., example virtual device locations represented by diamonds 1112-1128) along the path between image capture point 1006 and 1008.

In some implementations, user device 102 can generate the intermediate views based on the direction of travel of the virtual device from the first image capture point to the second image capture point. For example, when virtually moving the virtual device from image capture point 1004 to image capture point 1110, user device 102 can use a capture point view, or portion thereof, corresponding to captured images A and B (e.g., the capture images pointing in the direction of travel) at each image capture point 1004-1110 to generate the intermediate views for virtual device locations 1112-1128 since the virtual device is moving up and to the right in FIG. 11.

When moving the virtual device between several different image capture points, user device 102 can use the capture point views corresponding to the different image capture points to generate the intermediate views 1112-1128. For example, the current image capture point may be image capture point 1104. The user may select image capture point 1110 as a new image capture point to present on the display of user device 102. As the virtual user device moves between image capture point 1104 and image capture point 1110, the virtual device also passes, or transitions, through transitional image capture point 1106 and transitional image capture point 1108. To generate the intermediate views between each image capture point, navigation application 104 can use the capture point views, or portions thereof, associated with the nearest image capture points. For example, to generate intermediate views 1112-1116, navigation application 104 can use the capture point views associated with image capture points 1104 and 1106. To generate intermediate views 1118-1122, navigation application 104 can use the capture point views associated with transitional image capture points 1106 and 1108. To generate intermediate views 1124-1128, navigation application 104 can use the capture point views associated with image capture points 1108 and 1110.

Figure 12:
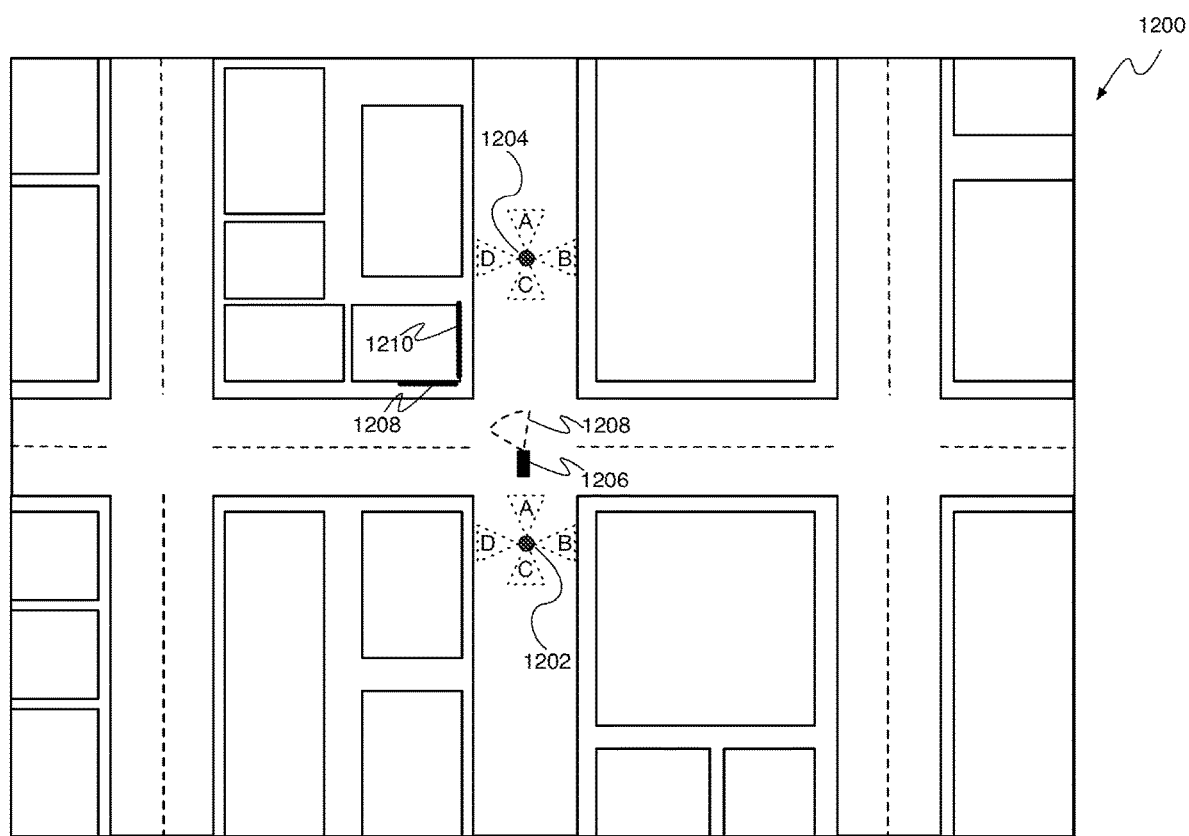
FIG. 12 is a conceptual illustration of how intermediate views are generated.

FIG. 12 is a conceptual illustration 1200 of how intermediate views are generated. For example, navigation application 104 on user device 102 can transform and/or combine capture point views generated for capture points to generate intermediate views between the capture points.

Illustration 1200 includes image capture point 1202 and image capture point 1204. Illustration 1200 includes a virtual device location 1206 where navigation application 104 can generate an intermediate view between image capture point 1202 and image capture point 1204. The intermediate view generated for virtual device location 1206 can include a street level view from the perspective of virtual device location 1206 and/or based on the direction of travel of the virtual device. In this example, the direction of travel is from image capture point 1202 to image capture point 1204. Thus, the perspective of the virtual device at each intermediate location can be, approximately, in the direction of image capture point 1204. In the examples that follow, the perspective of the virtual device from virtual device location 1206 (e.g., intermediate location 1206) can correspond to view angle cone 1208. Thus, the intermediate view generated for virtual device location 1206 can include three-dimensional model surfaces 1208 and 1210 (e.g., corresponding to a building near virtual device location 1206).

When generating an intermediate view for virtual device location 1206, for navigation application 104 can transform the capture point view corresponding to capture point 1202 into a transformed view that represents the perspective of the virtual device at virtual device location 1206. For example, user device 102 can obtain the capture point view corresponding to capture point 1202. User device 102 can obtain the portion of the capture point view corresponding to the perspective (e.g., as indicated by view angle cone 1208) of the virtual device at virtual device location 1206 as the virtual device travels from capture point 1202 to capture point 1204. For example, user device 102 can obtain the portion of the capture point view corresponding to capture point 1202 that includes three-dimensional model surfaces 1208 and 1210 and applied portions of the images (e.g., 1202A) captured at capture point 1202. User device 102 can transform the three-dimensional model associated with the capture point view of surfaces 1208 and 1210, and other objects in the perspective of the virtual device, such that it corresponds to, or represents, the view of surfaces 1208 and 1210 from the perspective of the virtual device at virtual device location 1206.

User device 102 can apply transformations similar to, or the same as, that applied to the three-dimensional model to the captured images (e.g., texture images) used to generate the capture point view at capture point 1202 so that the images still cover the surfaces of the three-dimensional model after the three-dimensional model has been transformed to represent the perspective of the virtual device at virtual device location 1206. In some cases, user device 102 may stretch (e.g., add pixels, multiply pixels, duplicate pixels, etc.) texture images to cover expanded surfaces of the transformed three-dimensional model when the transformation of the three-dimensional model adds surface area to surfaces 1208 and/or 1210. In other cases, user device 102 may compress (e.g., remove pixels) texture images when the transformation of the three-dimensional model removes surface area from surfaces 1208 and/or 1210. In yet other cases, user device 102 may add blank or black pixels to cover exposed surfaces of the transformed three-dimensional model when the transformation of the three-dimensional model exposes a surface not represented in the capture point view corresponding to capture point 1202. Thus, user device 102 can generate a first transformed view representing the perspective of the virtual device at virtual device location 1206 based on the capture point view corresponding to capture point 1202.

When generating an intermediate view for virtual device location 1206, for navigation application 104 can transform the capture point view corresponding to capture point 1204 into a transformed view that represents the perspective of the virtual device at virtual device location 1206. For example, user device 102 can obtain the capture point view corresponding to capture point 1204. User device 102 can obtain the portion of the capture point view corresponding to the perspective (e.g., as indicated by view angle cone 1208) of the virtual device at virtual device location 1206 as the virtual device travels from capture point 1202 to capture point 1204. For example, user device 102 can obtain the portion of the capture point view corresponding to capture point 1204 that includes three-dimensional model surfaces 1208 and 1210 and applied portions of the images (e.g., 1204D, 1204C) captured at capture point 1204. User device 102 can transform the three-dimensional model associated with the capture point view of surfaces 1208 and 1210, and other objects in the perspective of the virtual device, such that it corresponds to, or represents, the view of surfaces 1208 and 1210 from the perspective of the virtual device at virtual device location 1206.

User device 102 can apply transformations similar to that applied to the three-dimensional model to the captured images (e.g., texture images) used to generate the capture point view at capture point 1204 so that the images still cover the surfaces of the three-dimensional model after the three-dimensional model has been transformed to represent the perspective of the virtual device at virtual device location 1206. In some cases, user device 102 may stretch (e.g., add pixels, multiply pixels, duplicate pixels, etc.) texture images to cover expanded surfaces of the transformed three-dimensional model when the transformation of the three-dimensional model adds surface area to surfaces 1208 and/or 1210. In other cases, user device 102 may compress (e.g., remove pixels) texture images when the transformation of the three-dimensional model removes surface area from surfaces 1208 and/or 1210. In yet other cases, user device 102 may add blank or black pixels to cover exposed surfaces of the transformed three-dimensional model when the transformation of the three-dimensional model exposes a surface (e.g., surface 1208 with respect to capture point 1204) not represented in the capture point view corresponding to capture point 1204. Thus, user device 102 can generate a second transformed view representing the perspective of the virtual device at virtual device location 1206 based on the capture point view corresponding to capture point 1204.

In some implementations, the transformed three-dimensional model represented in the first transformed view and the second transformed view may be the same. For example, since the same real-world objects (e.g., surface 1208, surface 1210, etc.) are measured when generating the point clouds and meshes used for generating the three-dimensional model, the perspective of the model from virtual device location 1206 after transforming from the perspective of capture point 1202 and capture point 1204 should be the same regardless of starting capture point. However, since the images captured with respect to the model from the different capture points 1202, 1204 may be significantly different, the transformations of these images may produce images of vastly different quality depending on how much the images have been stretched, compressed, or otherwise altered during transformation to generate the respective transformed views.

As described above, navigation application 104 may stretch portions of a texture image to cover corresponding surfaces of the three-dimensional model when generating a transformed view based on a capture point view. For example, the more the perspective of the capture point view in relation to the surface of the object in the three-dimensional model deviates from 90 degrees off the surface of the object (e.g., surface 1210), the more navigation application 104 may need to stretch a portion of the corresponding texture image to cover a corresponding surface of the three-dimensional model when the model is transformed. To stretch an image, or portion thereof, navigation application 104 may duplicate, or multiply, certain pixels when the corresponding texture image (e.g. captured image) does not already include enough pixels to cover a surface of the three-dimensional model. For example, the perspective from capture point 1202 to surface 1208 is not at a very extreme angle (e.g., does not deviate too much from 90 degrees from surface 1208) and, therefore, the texture image applied to surface 1208 may not require much stretching when transformed from the perspective of capture point 1202 to the perspective of the virtual device at virtual device location 1206. In contrast, the perspective from capture point 1202 to surface 1210 is at a fairly extreme angle (e.g., deviates significantly from 90 degrees from surface 1210) and, therefore, the texture image applied to surface 1210 may require much stretching when transformed from the perspective of capture point 1202 to the perspective of the virtual device at virtual device location 1206.

For each transformed view, navigation application 104 can generate a quality score for each pixel of a transformed image in the transformed view that indicates the quality of the pixel in the transformed image. In some implementations, navigation application 104 can determine the quality score based on the amount of stretching that navigation application 104 had to perform at the pixel location when generating the transformed view. For example, the more stretching performed, the lower the score. The less stretching performed, the higher the score. In some implementations, navigation application 104 can determine the quality score based on the amount of compression that navigation application 104 had to perform at the pixel location when generating the transformed view. For example, the more compression performed, the lower the score. The less compression performed, the higher the score. In some implementations, navigation application 104 can determine the quality score based on whether the pixel is a blank or black pixel. For example, a blank or black pixel can indicate that the pixel corresponds to a surface that was not visible in the capture point view upon which the transformed view is based. Thus, the blank or black pixel should not be used to generate the intermediate view for the virtual device location 1206. Accordingly, blank or black pixels can be given a quality score of zero indicating that the pixel should not be used in the intermediate view.

In some implementations, a weighted pixel quality score can be calculated based on the distance between the virtual device location 1206 and the corresponding image capture point (e.g., image capture point 1202 or 1204). For example, the farther the image capture point is from the virtual device location, the greater the transformation required to transform the capture point view into the transformed view corresponding to the virtual device location. The greater the transformation required, the lower quality the resulting transformed view is likely to be. Thus, transformed views, and the image pixels therein, can be weighted to give more weight to the transformed views corresponding to image capture locations closer to the virtual device location. Thus, in illustration 1200, the transformed view, and pixels therein, corresponding to capture point 1202 may be given more weight (e.g., a pixel quality score multiplier) than the transformed view, and pixels therein, corresponding to capture point 1204 which is more distant from virtual device location 1206 than image capture point 1202.

Figure 13:
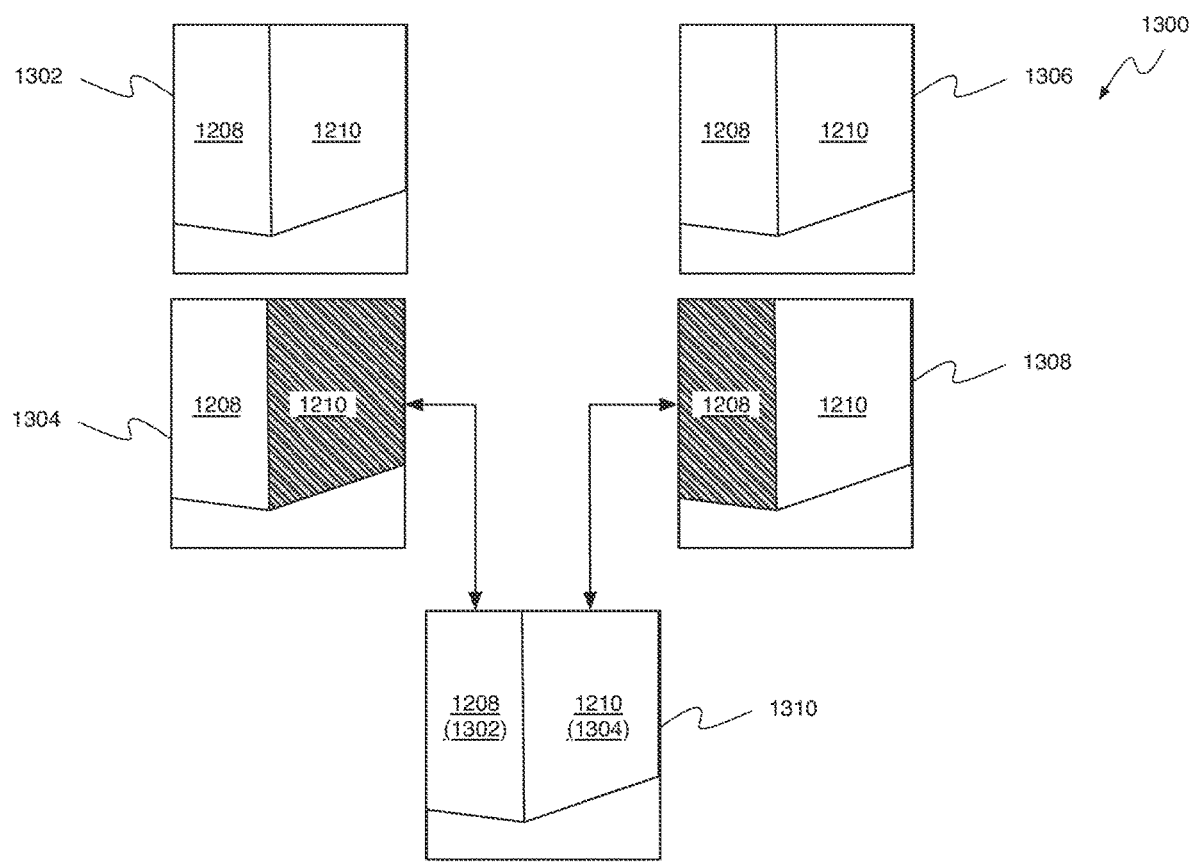
FIG. 13 is an illustration of a process for compositing transformed images into an intermediate view.

FIG. 13 is an illustration 1300 of a process for compositing transformed images into an intermediate view. For example, illustration 1300 depicts a mechanism for compositing, or combining, the first and second transformed images (e.g., based on the capture point views at capture points 1202, 1204), described above, into an intermediate view corresponding to the virtual device perspective at virtual device location 1206.

Illustration 1300 includes transformed view 1302 generated based on the capture point view corresponding to capture point 1202. For example, transformed view 1302 (e.g., an image) can include transformed images representing surfaces 1208 and 1210, as described above. Each pixel in transformed view 1302 can have a corresponding quality score (e.g., unweighted quality score, weighted quality score, etc.), as illustrated by pixel quality map 1304. For example, pixels in the areas colored by the diagonal lines (e.g., on surface 1210) denote areas where the corresponding pixel quality scores are relatively low (e.g., relative to transformed view 1306). Pixels in the areas not filled with diagonal lines denote areas where the corresponding pixel quality scores are relatively high (e.g., relative to transformed view 1306).

Illustration 1300 includes transformed view 1306 generated based on the capture point view corresponding to capture point 1204. For example, transformed view 1306 (e.g., an image) can include transformed images representing surfaces 1208 and 1210, as described above. Each pixel in transformed view 1306 can have a corresponding quality score (e.g., unweighted quality score, weighted quality score, etc.), as illustrated by pixel quality map 1308. For example, pixels in the areas colored by the diagonal lines (e.g., on surface 1208) denote areas where the corresponding pixel quality scores are relatively low (e.g., relative to transformed view 1302). Pixels in the areas not filled with diagonal lines denote areas where the corresponding pixel quality scores are relatively high (e.g., relative to transformed view 1302).

In some implementations, navigation application 104 can combine or composite transformed view 1302 and transformed view 1306 into intermediate view 1310 for virtual device location 1206 based on pixel quality scores. For example, to select the best quality images, or portions thereof, for the intermediate view 1310, navigation application can compare corresponding pixels (e.g., at the same location in transformed view 1302 and transformed view 1306) from transformed view 1302 and transformed view 1306 to determine which of the two corresponding pixels have the highest quality score. Navigation application 104 can then select the highest quality of the corresponding pixels for inclusion in intermediate view 1310. For example, navigation application 104 can compare the pixel quality scores for each of the pixels in transformed view 1302 and transformed view 1306 and determine that transformed view 1302 provides higher quality pixels for surface 1208 than transformed view 1306. Similarly, navigation application 104 can compare the pixel quality scores for each of the pixels in transformed view 1302 and transformed view 1306 and determine that transformed view 1306 provides higher quality pixels for surface 1210 than transformed view 1306. Based on these pixel quality determinations, navigation application 104 can generate intermediate view 1310 by including the images/pixels corresponding to surface 1208 from transformed view 1302 and by including the images/pixels corresponding to surface 1210 from transformed view 1306.

In some implementations, navigation application 104 can generate blurred versions of transformed view 1302 and transformed view 1306. For example, when pixel quality scores for corresponding pixels in both transformed view 1302 and transformed view 1306 are low (e.g., below some threshold value), navigation application 104 can use pixels from the blurred versions of transformed view 1302 and transformed view 1306 to generate corresponding pixels in intermediate view 1310. Navigation application 104 can select between the pixels of blurred transformed view 1302 and blurred transformed view 1306 based on distance between the virtual device location and the locations of the respective image capture points from which the transformed views were generated. For example, pixels from the blurred transformed view corresponding to the image capture point closest to the virtual device location may be selected and included in intermediate view 1310.

Figure 14:
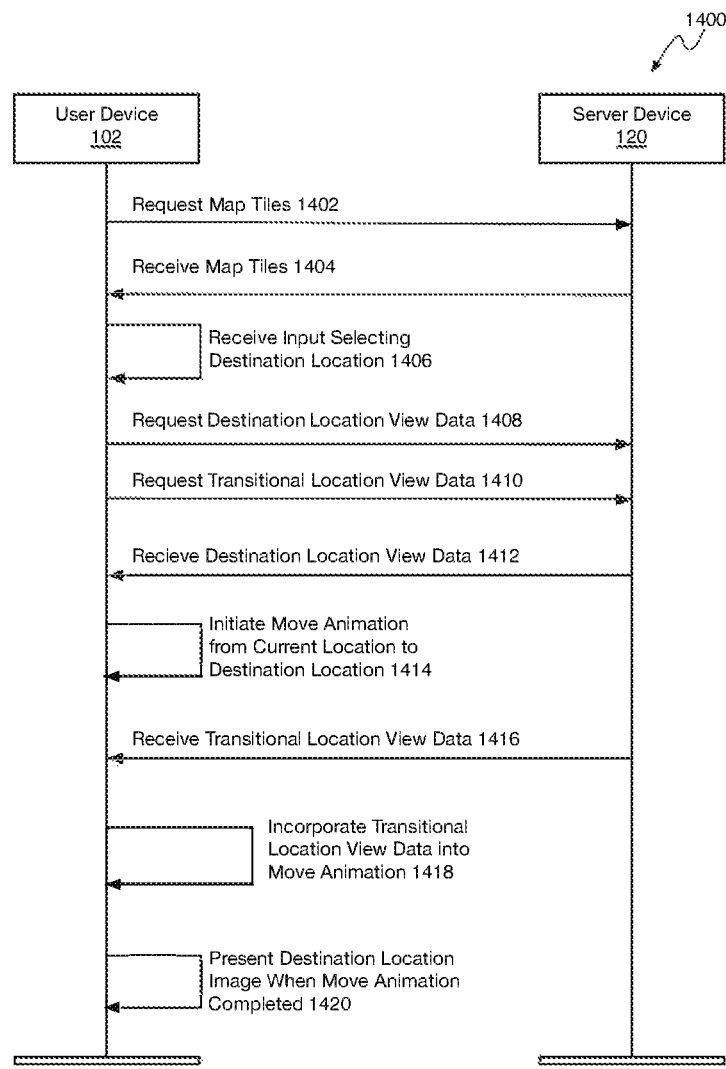
FIG. 14 is a system interaction diagram showing an example process for obtaining capture point data when generating a photorealistic animation simulating moving a virtual device from one image capture point to another image capture point.

FIG. 14 is a system interaction diagram showing an example process 1400 for obtaining capture point data when generating a photorealistic animation simulating moving a virtual device from one image capture point to another image capture point. For example, process 1400 can be performed to obtain captured images and three-dimensional models associated with capture points along a path between two selected capture points.

At step 1402, user device 102 can request map tiles. For example, user device 102 can request map tiles (e.g., map data bounded by a geographic area) from server device 120 for the current location, frequently visited locations, and/or nearby locations of user device 102. The map tile request can include information identifying these locations.

At step 1404, user device 102 can receive map tiles. For example, user device 102 can receive map tiles corresponding to the requested locations from server device 120. For example, server device 120 can determine which map tiles correspond to the requested locations and send the determined map tiles to user device 102. The map tiles can include image capture point data information for image capture point locations within the geographic area corresponding to the map tiles. The image capture point data for each image capture point location can include the locations of image capture points, images captured the image capture points, a three-dimensional model of the area near the image capture point, and/or other data as may be described herein. In some implementations, the image capture point data in the map tiles may include links, references, addresses, etc., indicating where user device 102 can obtain or download the corresponding image capture point data. For example, instead of including the images and/or three-dimensional model data, the image capture point data can include links to the images and/or three-dimensional model data stored on a server device (e.g., server device 120).

At step 1406, user device 102 can receive input selecting a destination location. For example, user device 102 can present images, point of interest data, etc., corresponding to a currently selected image capture point location. A user may wish to view a different image capture point or point of interest and can provide input selecting a new location to view on the display of user device 102. User device 102 can determine the image capture point nearest the selected new location and select the determined image capture point as the destination location.

At step 1408, user device 102 can request view data for the destination image capture point location. For example, user device 102 can determine a map tile that includes the destination location and obtain, from the map tile, information (e.g., links, addresses, etc.) for downloading the image capture point view data (e.g., captured images, three-dimensional model, etc.) for the destination location. For example, user device 102 can request the image capture point view data for the destination location from server device 120.

At step 1410, user device 102 can request view data for transitional image capture point locations. For example, user device 102 can determine transitional image capture points that lie between the current image capture point location and the destination image capture point location along a path between the current image capture point location and the destination image capture point location. User device 102 can determine map tiles that include the transitional image capture point locations and obtain, from the map tiles, information (e.g., links, addresses, etc.) for downloading the image capture point view data (e.g., captured images, three-dimensional model, etc.) for each transitional image capture point location. For example, user device 102 can request the image capture point view data for the transitional image capture point locations from server device 120 in sequence according to which transitional image capture point locations the virtual device will encounter first when traversing the path.

At step 1412, user device 102 can receive the image capture point data for the destination location. For example, server device 120 can send user device 102 the requested image capture point data (e.g., captured images, texture images, three-dimensional model, etc.) for the destination location.

At step 1414, user device 102 can initiate a move animation from the current image capture point location to the destination image capture point location. For example, instead of waiting to receive the image capture point view data for the first transitional image capture point location, user device 102 can start generating an intermediate view for the first intermediate virtual device location based on the image capture point view data for the current image capture point location and the destination image capture point location. If additional access point view data for other image access point locations is not received before step 1414 is complete, then user device 102 can present the generated intermediate view on a display of user device 102 to start the move animation.

At step 1416, user device 102 can receive transitional image capture point location view data. For example, user device 102 can receive transitional image capture point location view data for the first transitional image capture point location.

At step 1418, user device 102 can incorporate the transitional image capture point location view data into the move animation. For example, after receiving the transitional image capture point location view data for the first transitional image capture point location, user device 102 can generate a sequence of intermediate views animating a move between the current image capture point location and the first transitional image capture point location based on the view data for each location. User device 102 can present the intermediate views generated at step 1418 instead of, or before, the intermediate views generated at step 1416 when the view data is received. As view data for additional transitional image capture point locations are received, user device 102 can generate additional sequences of intermediate views for corresponding intermediate virtual device locations based on the received view data, as described above. For example, user device 102 can generate sequences of intermediate views for virtual device locations based on the available image capture point views for the image capture points nearest the virtual device location, as described above with reference to FIG. 11, FIG. 12, and FIG. 13. The sequences of intermediate views can be presented in sequence according to the path traversed between the current image capture point location and the destination image capture point location to generate a photorealistic animation depicting traveling along the path in a real-world environment. For example, user device 102 can present the move animation in dynamic street scene overlay 302, as described above.

At step 1420, user device 120 can present a destination location image when the move animation is completed. For example, user device 102 can present images depicting the real-world environment near the destination image capture point location, or point of interest, as described herein. In some implementations, user device 102 can present the images in dynamic street scene overlay 302, as described above. In some implementations, user device 102 can present the images using the virtual parallax techniques described below.

Figure 15:
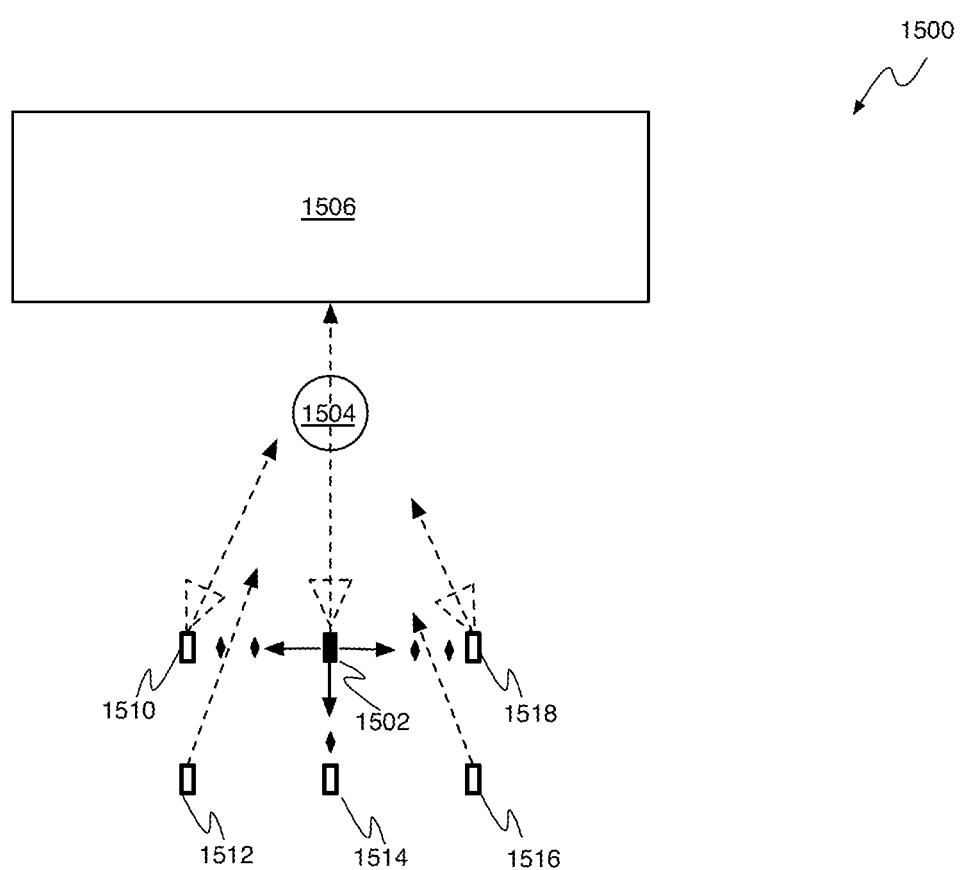
FIG. 15 is a conceptual illustration of generating a virtual parallax to create three-dimensional effects.

FIG. 15 is a conceptual illustration 1500 of generating a virtual parallax to create three-dimensional effects. For example, user device 102 can use a single two-dimensional image and a corresponding three-dimensional model to simulate a parallax effect to cause the two-dimensional image to appear to the user to be three-dimensional. For example, when presenting an image capture point view on a display of user device 102 (e.g., in dynamic street scene overlay 302), user device 102 can generate transformed views from the perspective of a virtual device (e.g., virtual camera) at different virtual locations around the map location of the corresponding image capture point based on the image capture point view. By presenting an animation that includes different perspectives of the image capture point view (e.g., captured images applied to the three-dimensional model associated with the image capture point, as described above), user device 102 can introduce parallax into the presentation of the image capture point view thereby causing the image capture point view to appear three-dimensional.

In some implementations, navigation application 104 can present an image capture point view from the perspective of a virtual device at an image capture point location 1502. As described above, an image capture point view can present be an image generated from images captured at a real-world location corresponding to the image capture point location 1502 applied to a three-dimensional model. The three-dimensional model in the example of FIG. 15 can model the surfaces of object 1504 (e.g., a light post, tree, person, etc.) and object 1506 (e.g., a building, wall, bridge, etc.). As illustrated, object 1504 may be positioned in front of object 1506 from the perspective of the virtual device positioned at capture point location 1502. Although the capture point view corresponding to image capture point location 1502 is generated based on a three-dimensional model of objects 1504 and 1506 textured with images (e.g., photographs) of objects 1504 and 1506, when user device 102 presents the capture point view on a display of user device 102, the capture point view will appear as a two dimensional image.

To give the capture point view a three-dimensional appearance, user device 102 (e.g., navigation application 104) can generate a virtual parallax effect by simulating multiple virtual image capture devices around or near the image capture point location 1502. For example, when user device 102 receives user input (e.g., user input to overlay 302, described above) to pan the capture point view image presented on the display of user device 102, user device 102 can move the virtual location of the virtual device from location 1502 to a nearby location (e.g., location 1510-1518) to the side and/or rear of virtual location 1502. As the virtual device is moved from location 1502, user device 102 can generate transformed images representing the changed perspective of the virtual device as the virtual devices moves based on the image capture point view (e.g., the captured images and three-dimensional model) corresponding to location 1502 thereby simulating different perspectives of different virtual devices (e.g., virtual cameras) captured at different locations.

In some implementations, the transformed images can be generated based on the frame rate of user device 102. As described above, user device 102 may have a frame rate of 120 frames per second. If it takes one second to move the virtual device from location 1502 to location 1510, then user device 102 will generate 120 transformed images representing the change in perspective of the virtual device in relation to objects 1504 and 1506 as the virtual device traverses through 120 locations on the way to location 1510. By presenting an animation that includes each one of these transformed images in sequence at the determined frame rate, the relative positions of objects 1504 and 1506 within each subsequent or adjacent transformed image will change thereby introducing the parallax effect and giving the transformed images, or animation, a three-dimensional appearance as the virtual device's perspective with respect to objects 1504 and 1506 changes with the movement.

In some implementations, the amount of horizontal movement of the virtual device can be based on user input speed. For example, to cause user device 102 to generate and present transformed images, user device 102 can receive user input indicating that the user wishes to pan the image corresponding to the capture point view. For example, user device 102 can detect touch input in the form of a swipe gesture left or right. In response to detecting the touch input, user device 102 can move the virtual device from location 1502 in a left (e.g., toward location 1510) or right (e.g., toward location 1518) direction and generate and present transformed images during the movement, as described above. The faster the swipe gesture, the greater the distance user device 102 will move the virtual device. For example, if user device 102 detects a slow swipe gesture left, user device 102 may slowly move the virtual device from location 1502 to the first diamond to the left of location 1502. If user device 102 detects a fast swipe gesture left, user device 102 may quickly move the virtual device from location 1502 to location 1510 or up to a maximum horizontal distance away from location 1502. When the maximum horizontal (e.g., lateral, panning, etc.) distance is reached, the virtual device can stay at the maximum horizontal distance until the user input ceases or until the user input causes user device 102 to move the virtual device in a different horizontal direction. When user device 102 no longer detects user input, user device 102 can move the virtual device back to position 1502 over a period of time (e.g., 1 second, 0.5 seconds, etc.).

In some implementations, the amount of backward movement of the virtual device can be based on the duration of user input. For example, the rearward movement of the virtual device (e.g., opposite the direction of view) can accumulate over time up to a maximum rearward distance. Thus, when the user provides panning input over an extended period of time, the virtual device can incrementally move toward location 1514 until the maximum rearward distance is reached. As user input continues, the virtual device will stay at the maximum rearward distance until the user input is no longer detected by user device 102. When user device 102 no longer detects user input, user device 102 can move the virtual device back to position 1502 over a period of time (e.g., 1 second, 0.5 seconds, etc.).

In some implementations, user device 102 can dynamically adjust the parallax effect based on the distance between the virtual device and the objects in the image capture point view. For example, user device 102 can move the virtual device a greater distance when the image capture point view includes objects that are near the virtual device to increase the parallax effect for nearby objects. User device 102 can move the virtual device a smaller distance when the image capture point view includes objects that are far from the virtual device to decrease the parallax effect for distant objects.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 16:
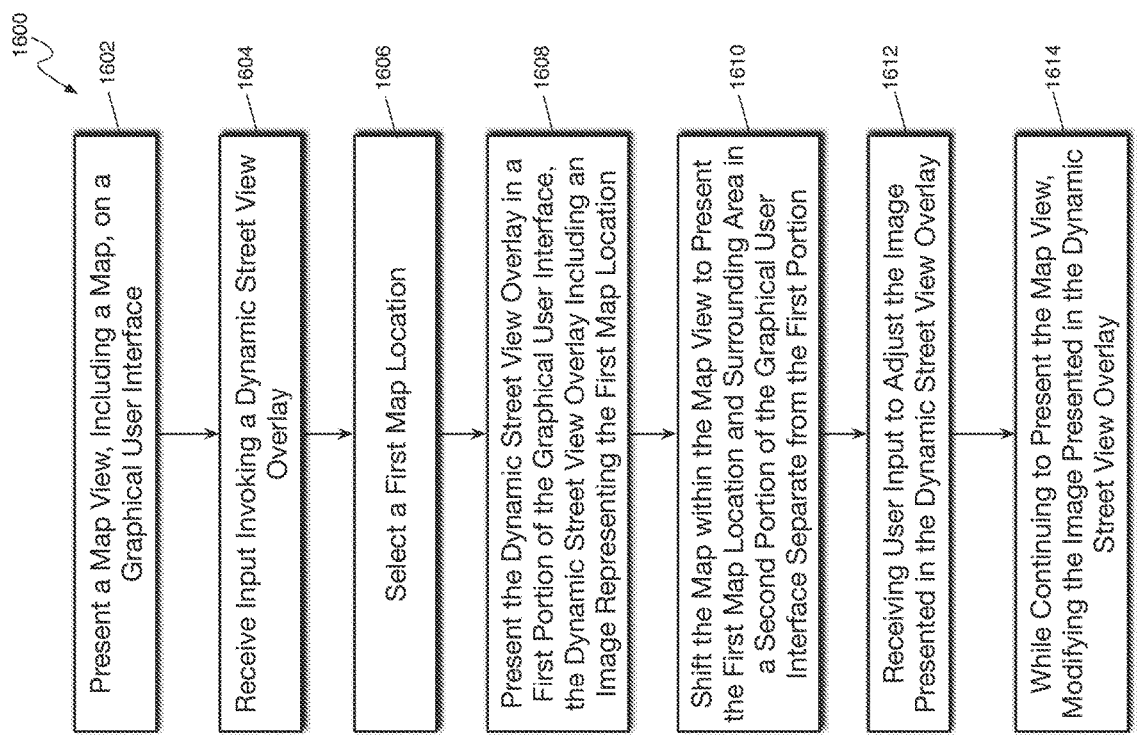
FIG. 16 is flow diagram of an example process for presenting a dynamic street scene overlay.

FIG. 16 is flow diagram of an example process 1600 for presenting a dynamic street scene overlay. For example, process 1600 can be performed by user device 102 to present a dynamic street scene overlay that allows the user to interact with and/or view images presented in the dynamic street scene overlay while still allowing the user to interact with and/or view a corresponding map view.

At step 1602, user device 102 can present a map view on a graphical user interface of user device 102. For example, the map view can include a map of a geographic area.

At step 1604, user device 102 can receive input invoking a dynamic street scene overlay. For example, user device 102 can receive input selecting graphical object 216 described above with reference to FIG. 2.

At step 1604, user device 102 can select a first map location. For example, in response to receiving the input invoking the dynamic street scene overlay, user device 102 can automatically select an image capture point location nearest the center of the geographic area presented in the map view. If user device 102 has previously received user input selecting a map location (e.g., image capture point location, point of interest, etc.), user device 102 can select an image capture point location nearest the map location selected by the user.

At step 1608, user device 102 can present the dynamic street scene overlay in a first portion of the graphical user interface. For example, the dynamic street scene overlay can be sized such that the details of an image presented in the dynamic street scene overlay can be easily seen by the user. For example, the dynamic street scene overlay can be sized to cover 25% or more of the display area of graphical user interface. The image presented by the dynamic street scene overlay can be an image representing the first map location. For example, the image can be a capture point view representing a perspective of the real-world environment from the first location. The image can be dynamic, manipulatable, and may present a three-dimensional appearance, as described herein.

At step 1610, user device 102 can shift the map presented within the map view to present the first map location and surrounding area in a second portion of the graphical user interface. For example, the second portion of the graphical user interface can be separate from the first portion of the graphical user interface such the dynamic street scene overlay does not obscure the user's view of the first map location and surrounding area. For example, the map within the map view can be shifted to move the display location (e.g., GUI location) of the first map location to the center of the second portion of the graphical user interface so that the user can view both the first map location on the map in the map view and the dynamic street scene overlay simultaneously. The first map location can be identified in the map view with a graphical object that indicates the first map location and the perspective (e.g., view angle) presented by the dynamic street scene overlay.

At step 1612, user device 102 can receive user input to adjust the image presented in the dynamic street scene overlay. For example, user device 102 can receive user input through the dynamic street scene overlay to change the perspective of the first location presented by the image. User device 102 can receive user input through the dynamic street scene overlay to select a second location that appears in the image presented by the dynamic street scene overlay. User device 102 can receive user input through the dynamic street scene overlay to pan the image presented by the dynamic street scene overlay to trigger a three-dimensional presentation of the perspective presented by the image, as described above.

In some implementations, user device 102 can receive user input through the map view that causes user device to adjust the image presented in the dynamic street scene overlay. For example, user device 102 can receive user input to scroll the map in the map view underneath the location indicator graphical object (e.g., graphical object 312) and select a second location, as described above. User device 102 can adjust the image presented in the dynamic street scene overlay to represent a perspective of the real-world environment from the second location. User device 102 can receive user input to adjust the image presented in the dynamic street scene overlay in other ways, as may be described elsewhere herein.

At step 1614, user device 102 can modify the image presented in the dynamic street scene overlay. For example, while continuing to present the map view, and the location indicator graphical object, in the second portion of the graphical user interface, user device 102 can modify the image presented in the dynamic street scene overlay. The modifications can include presenting a different perspective of the first location, presenting a photorealistic animation of moving from the first location to a second location, presenting a photorealistic animation of the first location that introduces a three-dimensional effect, and/or presenting a perspective of a second location, among other things, as may be described elsewhere herein.

Figure 17:
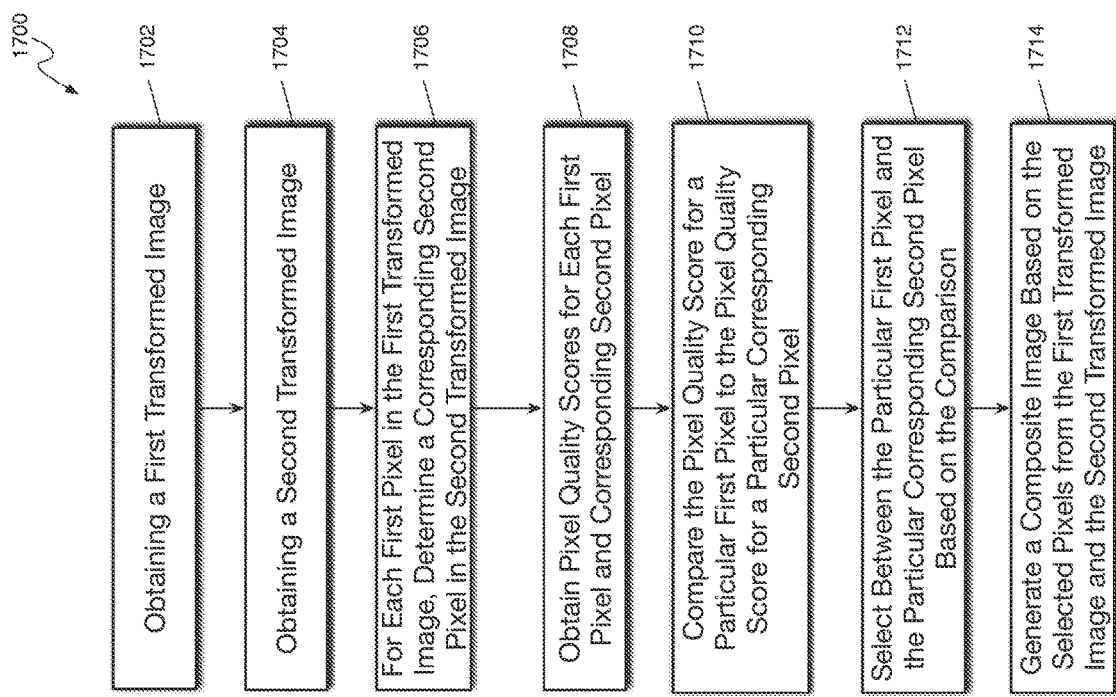
FIG. 17 is flow diagram of an example process for compositing images to improve image quality.

FIG. 17 is flow diagram of an example process 1700 for compositing images to improve image quality. For example, process 1700 can be performed by user device 102 to composite images associated with a first image capture point and a second image capture point when generating intermediate views of virtual device locations along a path from a first image capture point to a second image capture point, as described above with reference to FIG. 11-FIG. 14.

At step 1702, user device 102 can obtain a first transformed image. For example, the first transformed image can be generated based on a first image capture point view corresponding to a first image capture point. The first image capture point view can be transformed from the perspective of a portion of a photorealistic three-dimensional model as viewed from the first image capture point location to a perspective of a portion of a photorealistic three-dimensional model as viewed from an intermediate location between the first image capture point and a second image capture point.

At step 1704, user device 102 can obtain a second transformed image. For example, the second transformed image can be generated based on a second image capture point view corresponding to the second image capture point. The second image capture point view can be transformed from the perspective of a portion of a photorealistic three-dimensional model as viewed from the second image capture point location to a perspective of a portion of a photorealistic three-dimensional model as viewed from an intermediate location between the first image capture point and a second image capture point.

At step 1706, user device 102 can determine corresponding pixels in the first transformed image and the second transformed image. For example, for each pixel in the first transformed image, user device 102 can determine a corresponding second pixel in the second transformed image.

At step 1708, user device 102 can compare the pixel quality scores for a particular first pixel to the pixel quality score for a particular corresponding second pixel. For example, user device 102 can generate quality scores for each pixel in the first and second transformed images. User device 102 can generate the quality scores can be based on the amount of stretch or compression applied to the pixel location within the corresponding transformed image. User device 102 can generate the quality scores for pixels based on whether the pixel corresponds to a surface of a corresponding three-dimensional model that is visible in the capture point view from which the transformed image was generated. In some implementations, the quality scores for a transformed image can be weighted based on the distance between the intermediate location (e.g., virtual device location) and the image capture point location associated with the transformed image.

At step 1710, user device 102 can compare the pixel quality score for a particular first pixel to the pixel quality score for a particular corresponding second pixel. For example, user device 102 can compare the quality score for each pixel in the first transformed image to the quality score for a corresponding pixel in the second transformed image. For example, the corresponding pixel can be a particular pixel in the second transformed image that occupies the same relative position in the second transformed image as the particular pixel in the first transformed image.

At step 1712, user device 102 can select between the particular first pixel and the particular corresponding second pixel based on the comparison at step 1710. For example, if the particular first pixel has a quality score that is higher than the particular corresponding second pixel, then user device 102 can select the particular first pixel. However, if the particular corresponding second pixel has a quality score that is higher than the particular first pixel, then user device 102 can select the particular first pixel. In some implementations, if both the particular first pixel and the particular corresponding second have quality scores below a threshold value, a blurred pixel can be selected, as described above. User device 102 can perform this pixel selection operation for each corresponding pair of pixels in the first transformed image and the second transformed image.

At step 1714, user device 102 can generate a composite image based on the selected pixels from the first transformed image and/or the second transformed image. For example, user device 102 can generate a composite image by including the selected pixels in the composite image according to their respective, or relative, locations in the first and/or second transformed images. Thus, the composite image (e.g., intermediate view) can represent the same views as the first and second transformed images but can include the highest quality portions of the first and/or second transformed images, as described above.

Figure 18:
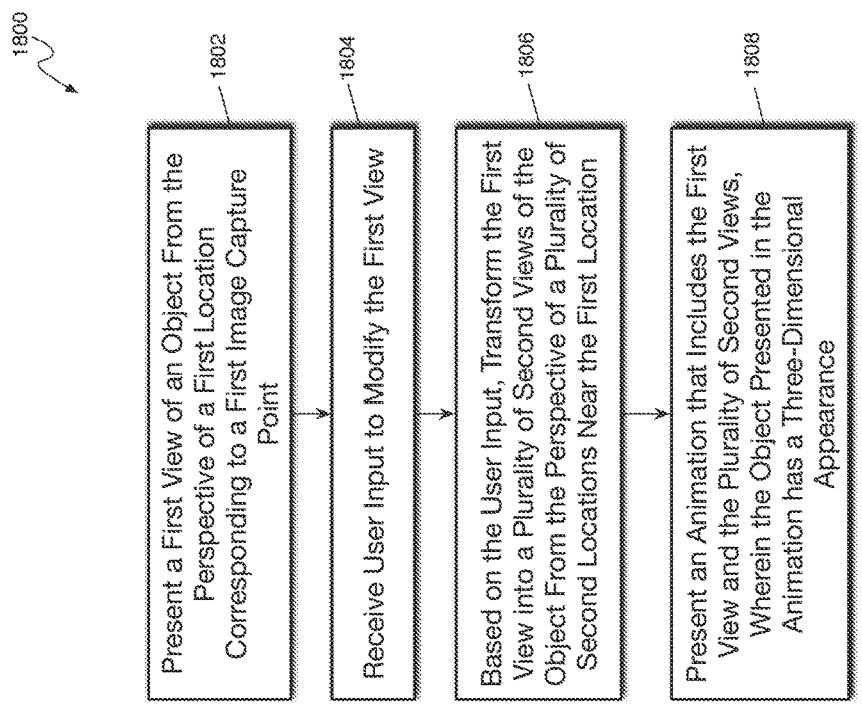
FIG. 18 is flow diagram of an example process for generating virtual parallax to a create three-dimensional appearance.

FIG. 18 is flow diagram of an example process 1800 for generating virtual parallax to a create three-dimensional appearance. For example, process 1800 can be generated by user device 102 to give a two-dimensional image of an object, or objects, a three-dimensional appearance. Although a single two-dimensional image is used, user device 102 can transform the two-dimensional image to simulate images of the object, or objects, captured by different virtual image capture devices at different virtual locations thereby introducing a virtual parallax and a corresponding three-dimensional effect or appearance into the two-dimensional image, as described above with reference to FIG. 15.

At step 1802, user device 102 can present a first view of an object, or objects, from the perspective of a first location corresponding to a first image capture point. For example, the first view can be a view (e.g., two-dimensional image, image capture point view, etc.) of a photorealistic three-dimensional model from the perspective of the first image capture point. The photorealistic three-dimensional model can include various objects, including buildings, trees, street light posts, cars, etc.

At step 1904, user device 102 can receive user input to modify the first view. For example, user device 102 can receive user input to pan the image presented in the first view left or right.

At step 1906, user device 102 can transform the first view into a plurality of second views of the object, or objects, from the perspective of a plurality of second locations near the first location. For example, in response to the user input, user device 102 can determine a plurality of second locations (e.g., virtual device locations) along a path or trajectory near the first location of the image capture point. For example, the path or trajectory can cause a virtual device to move left, right, and/or back from the image capture point based on the type of user input received. User device 102 can generate transformed views from the perspective of each of the plurality of second locations based on an image capture point view for the first image capture point, as described above.

At step 1908, user device 102 can present an animation that includes the first view and the plurality of second views. For example, user device 102 can present a sequence of frames that include the first view and sequence of second views (e.g., transformed views) as the virtual device moves from and back to the first location of the first image capture point. As the sequence of frames (e.g., sequence of views) are presented, objects depicted in the animation frames can appear to be three-dimensional objects due to the change in perspective represented by each of the views.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve the presentation of map related data and/or imagery. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present locations and location data that are of interest to the user. In some cases, private information such as faces, license plates, or other personal identification information can be captured in the map data and/or image collection process. When private information is captured in images and/or photographs, this private information can be blurred or otherwise obscured to avoid sharing the private information when distributing map data, as described herein. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, when presenting map data, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, map data can be presented based on non-personal information data or a bare minimum amount of personal information, such as the content being requested by the device associated with a user, other non-personal information available to the map services, or publicly available information.

Example System Architecture

Figure 19:
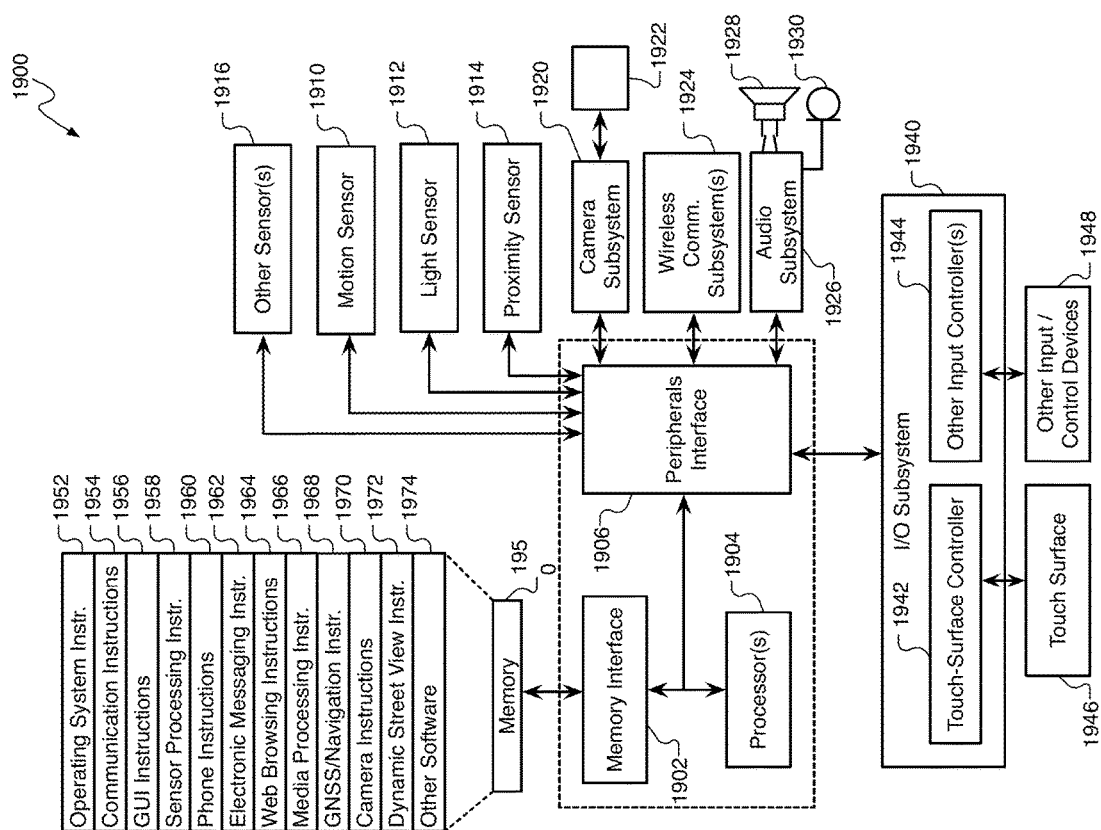
FIG. 19 is a block diagram of an example computing device that can implement the features and processes of FIGS. 1-18.

FIG. 19 is a block diagram of an example computing device 1900 that can implement the features and processes of FIGS. 1-18. The computing device 1900 can include a memory interface 1902, one or more data processors, image processors and/or central processing units 1904, and a peripherals interface 1906. The memory interface 1902, the one or more processors 1904 and/or the peripherals interface 1906 can be separate components or can be integrated in one or more integrated circuits. The various components in the computing device 1900 can be coupled by one or more communication buses or signal lines.

Sensors, devices, and subsystems can be coupled to the peripherals interface 1906 to facilitate multiple functionalities. For example, a motion sensor 1910, a light sensor 1912, and a proximity sensor 1914 can be coupled to the peripherals interface 1906 to facilitate orientation, lighting, and proximity functions. Other sensors 1916 can also be connected to the peripherals interface 1906, such as a global navigation satellite system (GNSS) (e.g., GPS receiver), a temperature sensor, a biometric sensor, magnetometer or other sensing device, to facilitate related functionalities.

A camera subsystem 1920 and an optical sensor 1922, e.g., a charged coupled device (CCD) or a complementary metal-oxide semiconductor (CMOS) optical sensor, can be utilized to facilitate camera functions, such as recording photographs and video clips. The camera subsystem 1920 and the optical sensor 1922 can be used to collect images of a user to be used during authentication of a user, e.g., by performing facial recognition analysis.

Communication functions can be facilitated through one or more wireless communication subsystems 1924, which can include radio frequency receivers and transmitters and/or optical (e.g., infrared) receivers and transmitters. The specific design and implementation of the communication subsystem 1924 can depend on the communication network(s) over which the computing device 1900 is intended to operate. For example, the computing device 1900 can include communication subsystems 1924 designed to operate over a GSM network, a GPRS network, an EDGE network, a Wi-Fi or WiMax network, and a Bluetooth™ network. In particular, the wireless communication subsystems 1924 can include hosting protocols such that the device 100 can be configured as a base station for other wireless devices.

An audio subsystem 1926 can be coupled to a speaker 1928 and a microphone 1930 to facilitate voice-enabled functions, such as speaker recognition, voice replication, digital recording, and telephony functions. The audio subsystem 1926 can be configured to facilitate processing voice commands, voiceprinting and voice authentication, for example.

The I/O subsystem 1940 can include a touch-surface controller 1942 and/or other input controller(s) 1944. The touch-surface controller 1942 can be coupled to a touch surface 1946. The touch surface 1946 and touch-surface controller 1942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1946.

The other input controller(s) 1944 can be coupled to other input/control devices 1948, such as one or more buttons, rocker switches, thumb-wheel, infrared port, USB port, and/or a pointer device such as a stylus. The one or more buttons (not shown) can include an up/down button for volume control of the speaker 1928 and/or the microphone 1930.

In one implementation, a pressing of the button for a first duration can disengage a lock of the touch surface 1946; and a pressing of the button for a second duration that is longer than the first duration can turn power to the computing device 1900 on or off. Pressing the button for a third duration can activate a voice control, or voice command, module that enables the user to speak commands into the microphone 1930 to cause the device to execute the spoken command. The user can customize a functionality of one or more of the buttons. The touch surface 1946 can, for example, also be used to implement virtual or soft buttons and/or a keyboard.

In some implementations, the computing device 1900 can present recorded audio and/or video files, such as MP3, AAC, and MPEG files. In some implementations, the computing device 1900 can include the functionality of an MP3 player, such as an iPod™.

The memory interface 1902 can be coupled to memory 1950. The memory 1950 can include high-speed random-access memory and/or non-volatile memory, such as one or more magnetic disk storage devices, one or more optical storage devices, and/or flash memory (e.g., NAND, NOR). The memory 1950 can store an operating system 1952, such as Darwin, RTXC, LINUX, UNIX, OS X, WINDOWS, or an embedded operating system such as VxWorks.

The operating system 1952 can include instructions for handling basic system services and for performing hardware dependent tasks. In some implementations, the operating system 1952 can be a kernel (e.g., UNIX kernel). In some implementations, the operating system 1952 can include instructions for performing voice authentication. For example, operating system 1952 can implement the dynamic street scene overlay features as described with reference to FIGS. 1-18.

The memory 1950 can also store communication instructions 1954 to facilitate communicating with one or more additional devices, one or more computers and/or one or more servers. The memory 1950 can include graphical user interface instructions 1956 to facilitate graphic user interface processing; sensor processing instructions 1958 to facilitate sensor-related processing and functions; phone instructions 1960 to facilitate phone-related processes and functions; electronic messaging instructions 1962 to facilitate electronic-messaging related processes and functions; web browsing instructions 1964 to facilitate web browsing-related processes and functions; media processing instructions 1966 to facilitate media processing-related processes and functions; GNSS/Navigation instructions 1968 to facilitate GNSS and navigation-related processes and instructions; and/or camera instructions 1970 to facilitate camera-related processes and functions.

The memory 1950 can store software instructions 1972 to facilitate other processes and functions, such as the dynamic street scene overlay processes and functions as described with reference to FIGS. 1-18.

The memory 1950 can also store other software instructions 1974, such as web video instructions to facilitate web video-related processes and functions; and/or web shopping instructions to facilitate web shopping-related processes and functions. In some implementations, the media processing instructions 1966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1950 can include additional instructions or fewer instructions. Furthermore, various functions of the computing device 1900 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
    obtaining, by a computing device, a first captured image including a first perspective of an object captured from a first capture location;
    presenting, by the computing device, the first captured image on a display of the computing device;
    while presenting the first captured image, receiving, by the computing device, a user input manipulating the first captured image;
    in response to receiving the user input:
        determining, by the computing device, a first virtual location within a threshold distance from the first capture location;
        transforming, by the computing device, the first captured image to depict a second perspective of the object from the first virtual location to generate a first transformed image;
        generating, by the computing device, an animation that simulates a parallax effect with respect to the object that causes the object to appear three-dimensional by transitioning from the first captured image to the first transformed image and back to the first captured image; and
        presenting, by the computing device, the animation on the display of the computing device.

2. The method of claim 1, further comprising:
    determining, by the computing device, a speed associated with the user input; and
    determining, by the computing device, a lateral distance from the first capture location based on the speed; and
    determining the first virtual location based on the lateral distance.

3. The method of claim 1, further comprising:
    determining, by the computing device, a duration associated with the user input; and
    determining, by the computing device, a rearward distance from the first capture location and away from the object based on the duration; and
    determining the first virtual location based on the rearward distance.

4. The method of claim 1, further comprising:
    adjusting the threshold distance based on a determined distance between the first capture location and the object.

5. The method of claim 1, further comprising:
    obtaining, by the computing device, a three-dimensional model of the object; and
    transforming, by the computing device, the first captured image to depict the second perspective of the object from the first virtual location based on the three-dimensional model.

6. The method of claim 1, further comprising:
    generating, by the computing device, a plurality of transformed images corresponding to a plurality of virtual locations near the first capture location, the plurality of transformed images including the first transformed image;
    generating, by the computing device, a photorealistic animation simulating the parallax effect with respect to the object near the first capture location based on the plurality of intermediate images; and
    presenting, by the computing device, the photorealistic animation on a display of the computing device.

7. The method of claim 6, further comprising:
    determining a frame rate corresponding to the computing device; and
    determining the plurality of virtual locations based on the frame rate of the computing device.

8. A non-transitory computer readable medium including one or more sequences of instructions that, when executed by one or more processors, cause the processors to perform operations comprising:
    obtaining, by a computing device, a first captured image including a first perspective of an object captured from a first capture location;
    presenting, by the computing device, the first captured image on a display of the computing device;
    while presenting the first captured image, receiving, by the computing device, a user input manipulating the first captured image;
    in response to receiving the user input:
        determining, by the computing device, a first virtual location within a threshold distance from the first capture location;
        transforming, by the computing device, the first captured image to depict a second perspective of the object from the first virtual location to generate a first transformed image;
        generating, by the computing device, an animation that simulates a parallax effect with respect to the object that causes the object to appear three-dimensional by transitioning from the first captured image to the first transformed image and back to the first captured image; and
        presenting, by the computing device, the animation on the display of the computing device.

9. The non-transitory computer readable medium of claim 8, wherein the instructions cause the processors to perform operations comprising:
    determining, by the computing device, a speed associated with the user input; and
    determining, by the computing device, a lateral distance from the first capture location based on the speed; and
    determining the first virtual location based on the lateral distance.

10. The non-transitory computer readable medium of claim 8, wherein the instructions cause the processors to perform operations comprising:
    determining, by the computing device, a duration associated with the user input; and
    determining, by the computing device, a rearward distance from the first capture location and away from the object based on the duration; and
    determining the first virtual location based on the rearward distance.

11. The non-transitory computer readable medium of claim 8, wherein the instructions cause the processors to perform operations comprising:
    adjusting the threshold distance based on a determined distance between the first capture location and the object.

12. The non-transitory computer readable medium of claim 8, wherein the instructions cause the processors to perform operations comprising:
    obtaining, by the computing device, a three-dimensional model of the object; and
    transforming, by the computing device, the first captured image to depict the second perspective of the object from the first virtual location based on the three-dimensional model.

13. The non-transitory computer readable medium of claim 8, wherein the instructions cause the processors to perform operations comprising:
    generating, by the computing device, a plurality of transformed images corresponding to a plurality of virtual locations near the first capture location, the plurality of transformed images including the first transformed image;
    generating, by the computing device, a photorealistic animation simulating the parallax effect with respect to the object near the first capture location based on the plurality of intermediate images; and
    presenting, by the computing device, the photorealistic animation on a display of the computing device.

14. The non-transitory computer readable medium of claim 13, wherein the instructions cause the processors to perform operations comprising:
    determining a frame rate corresponding to the computing device; and
    determining the plurality of virtual locations based on the frame rate of the computing device.

15. A system comprising:
    one or more processors; and
    a non-transitory computer readable medium including one or more sequences of instructions that, when executed by the one or more processors, cause the processors to perform operations comprising:
        obtaining, by a computing device, a first captured image including a first perspective of an object captured from a first capture location;
        presenting, by the computing device, the first captured image on a display of the computing device;
        while presenting the first captured image, receiving, by the computing device, a user input manipulating the first captured image;
        in response to receiving the user input:
            determining, by the computing device, a first virtual location within a threshold distance from the first capture location;
            transforming, by the computing device, the first captured image to depict a second perspective of the object from the first virtual location to generate a first transformed image;
            generating, by the computing device, an animation that simulates a parallax effect with respect to the object that causes the object to appear three-dimensional by transitioning from the first captured image to the first transformed image and back to the first captured image; and
            presenting, by the computing device, the animation on the display of the computing device.

16. The system of claim 15, wherein the instructions cause the processors to perform operations comprising:
    determining, by the computing device, a speed associated with the user input; and
    determining, by the computing device, a lateral distance from the first capture location based on the speed; and
    determining the first virtual location based on the lateral distance.

17. The system of claim 15, wherein the instructions cause the processors to perform operations comprising:
    determining, by the computing device, a duration associated with the user input; and
    determining, by the computing device, a rearward distance from the first capture location and away from the object based on the duration; and
    determining the first virtual location based on the rearward distance.

18. The system of claim 15, wherein the instructions cause the processors to perform operations comprising:
    adjusting the threshold distance based on a determined distance between the first capture location and the object.

19. The system of claim 15, wherein the instructions cause the processors to perform operations comprising:
    obtaining, by the computing device, a three-dimensional model of the object; and
    transforming, by the computing device, the first captured image to depict the second perspective of the object from the first virtual location based on the three-dimensional model.

20. The system of claim 15, wherein the instructions cause the processors to perform operations comprising:
    generating, by the computing device, a plurality of transformed images corresponding to a plurality of virtual locations near the first capture location, the plurality of transformed images including the first transformed image;
    generating, by the computing device, a photorealistic animation simulating the parallax effect with respect to the object near the first capture location based on the plurality of intermediate images; and
    presenting, by the computing device, the photorealistic animation on a display of the computing device.

21. The system of claim 20, wherein the instructions cause the processors to perform operations comprising:
    determining a frame rate corresponding to the computing device; and
    determining the plurality of virtual locations based on the frame rate of the computing device.

* * * * *